US012792545B1

(12) United States Patent
Fresa et al.

(10) Patent No.: US 12,792,545 B1
(45) Date of Patent: Nov. 10, 2026

(54) UNIVERSAL CONTROL BOARD FOR CRYPTOCURRENCY MINERS

(71) Applicants: Marc Fresa, Shelton, CT (US); Sveatoslav Grebenciucov, Tiraspol (MD)

(72) Inventors: Marc Fresa, Shelton, CT (US); Sveatoslav Grebenciucov, Tiraspol (MD)

( * ) Notice: Subject to any disclaimer, the term of this patent is extended or adjusted under 35 U.S.C. 154(b) by 250 days.

(21) Appl. No.: 18/400,664

(22) Filed: Dec. 29, 2023

Related U.S. Application Data

(60) Provisional application No. 63/531,589, filed on Aug. 9, 2023, provisional application No. 63/438,372, filed on Jan. 11, 2023.

(51) Int. Cl.
*G06F 13/40* (2006.01)
*G06F 13/16* (2006.01)

(52) U.S. Cl.
CPC ...... *G06F 13/4022* (2013.01); *G06F 13/1684* (2013.01); *G06F 2213/0024* (2013.01); *G06F 2213/38* (2013.01)

(58) Field of Classification Search
CPC ............. G06F 13/4022; G06F 13/1684; G06F 2213/0024; G06F 2213/38
See application file for complete search history.

(56) References Cited

U.S. PATENT DOCUMENTS 5,457,784 A 10/1995 Wells et al.
6,595,783 B1 7/2003 Steinman et al.
6,826,638 B1 11/2004 Jaggers et al.
7,764,508 B2 7/2010 Huang et al.
10,614,005 B1 4/2020 Villano et al.
11,546,992 B2 1/2023 Hill et al.
2001/0042242 A1* 11/2001 Fish .................... G06F 13/4068 713/1
2005/0120153 A1 6/2005 Perez et al.
2014/0051269 A1 2/2014 Chang et al.
2016/0026596 A1* 1/2016 Klein .................. G06F 13/4068 710/313
2023/0037377 A1* 2/2023 Fresa ...................... G06F 1/206
(Continued)

FOREIGN PATENT DOCUMENTS

CN 102749963 10/2012
CN 104125708 10/2014

*Primary Examiner* — Nimesh G Patel
(74) *Attorney, Agent, or Firm* — Vaughn Marquis, Esq.

(57) ABSTRACT

A universal control board including a system on module board, and a fixed input-output interface, or interchangeable interface board for electrically connecting, communicating with, and controlling different pluralities of hashboards used in cryptocurrency miners. Adapters or adapter boards having different electrical configurations are provided for connecting different models and/or types of hashboards to the universal control board. Firmware and/or drivers needed for controlling each hashboard is retrieved from memory by one or more processors based on determined hashboard identifiers that correspond to particular type and/or model of hashboards connected to the universal control board. A firmware and/or driver library including various firmware/drivers is hosted in memory on the universal control board, or retrieved from an external device or cloud management system over a wired or wireless network.

66 Claims, 17 Drawing Sheets

(56) References Cited

U.S. PATENT DOCUMENTS

| | | | | |
|---|---|---|---|---|
| 2023/0100033 | A1* | 3/2023 | Ma | G06Q 20/065 705/64 |
| 2023/0376059 | A1* | 11/2023 | Wu | G06F 1/26 |
| 2024/0104043 | A1* | 3/2024 | Chauhan | G06F 13/4045 |
| 2025/0112207 | A1* | 4/2025 | Suresh | H01L 25/0655 |

* cited by examiner

UNIVERSAL CONTROL BOARD FOR CRYPTOCURRENCY MINERS

CROSS-REFERENCE TO RELATED APPLICATIONS

This application claims priority to U.S. Provisional Patent Application Ser. No. 63/438,372, filed Jan. 11, 2023, and to U.S. Provisional Patent Application Ser. No. 63/531,589, filed Aug. 9, 2023, which are incorporated by reference herein in their entireties.

FIELD OF INVENTION

The present invention relates to computer accessories and devices, and more particularly, to a universal control board including a system on module board, an interchangeable interface board, and various adapters, and adapter boards for electrically connecting, communicating with, and controlling different pluralities of hashboards for use in cryptocurrency miners.

BACKGROUND OF THE INVENTION

Cryptocurrency mining machines are generally employed for mining various digital currencies including for example, bitcoin. Mining machines generally include a main control board for electrically connecting and communicating with a plurality of hashboards having integrated chips that often comprise application-specific integrated chips (ASIC), or field programmable gate array chips (FPGA). Such integrated chips are each embedded with specific mining algorithms to solve complex mathematical computations. The speed at which these algorithms solve mathematical equations, or the amount of calculations performed per second, is defined by hash rate where higher hash rates typically correlate to higher profits when mining digital currency.

Conventional control boards generally include a host of electronic components including networking interface circuitry, one or more processors, memory, and additional electronics that are mounted on a printed circuit board, and functionally interact together to communicate with, and control the hashboards. Design and functionality of control boards is generally fixed and defined by electronic components that are needed to control particular types, and/or models of hashboards. Accommodating different types of hashboards requires a host of different control boards because many hashboards are simply incompatible for use with certain control boards, and vice-versa, thereby limiting the use of mining machines to certain applications. Replacing old hashboards with newly designed hashboards necessitates revamping control boards with newly designed circuits, and components. For example, new hashboards nay include alternative pin layouts, new data control architectures, more advanced circuitry, or different electrical connection configurations that is not compatible with existing control boards. To accommodate technological advancements in hashboards, continuous functional changes have to be made to control boards thus driving up costs, for reconfiguring and upgrading conventional control boards.

In accordance with the aforementioned problems provided in the prior art, there exists a need to provide a universal control board that is electrically compatible for use with different types and/or models of hashboards provided in cryptocurrency miners. There is also a need for a variety of adapters, and/or adapter boards that are provided to further accommodate electrically connecting hashboards having different connector layouts or pin configurations to the universal control board to facilitate setup and repairs, accommodate interchangeability, and promote universal compatibility.

SUMMARY OF THE INVENTION

There is provided a universal control board comprising a universal system on module board removeably, electrically connected to an interchangeable interface board having electrical interface connectors that are adapted for electrically connecting, and controlling different pluralities of hashboards where each plurality of hashboards includes the same type and/or model. There is also provided an integral, universal control board that includes a system on module circuit, and electrical interface connectors adapted for electrically connecting, and controlling different pluralities of hashboards. A variety of adapters, and/or adapter boards are provided to further accommodate electrically connecting hashboards having different connector layouts or pin configurations to the universal control board.

In one embodiment, there is provided a universal control board configured to communicate with a plurality of hashboards each including a plurality of mining chips for use in cryptocurrency mining machines, where the universal control board comprises: an interface board comprising a first printed circuit board including an Ethernet circuit having an Ethernet port, the Ethernet circuit being adapted to communicate with an external device over a wired or wireless network, a power circuit including a power connector for receiving an external power source, a plurality of electrical hashboard connectors, and an electrical board connector; a universal system on module board comprising a second printed circuit board including electrical board contacts electrically coupled to a system on module circuit, the system on module circuit including one or more processors in electrical communication with memory hosting computer-executable board instructions, via, a memory interface, the universal system on module board being removeably, electrically connected to the interface board such that the electrical board contacts engage the electrical board connector where the Ethernet circuit, power circuit, plurality of electrical hashboard connectors, and electrical board connector are electrically interfaced to the system on module circuit, the power circuit selectively powering the interface board and the universal system on module board, and where upon instructing the one or more processors to retrieve firmware pursuant to hashboard identifiers associated with each of said plurality of hashboards, said one or more processors processes and executes the retrieved firmware to communicate with and control each of the plurality of hashboards when electrically connected to each of the plurality of electrical hashboard connectors.

Each of the plurality of electrical hashboard connectors comprise any of a socket connector, or a plug-in connector. The one or more processors includes any of one or more central processing units, one or more main processing units, one or more field programmable gate array chips, and the memory includes any of one or more memory management units, one or more DDR memory chips, one or more NAND memory chips, memory interfaces, or any combination thereof. The electrical board connector comprises a peripheral component interconnect-x connector, a peripheral component interconnect express connector, a mini-peripheral component interconnect connector, or a sodimm connector.

Advantageously, the firmware is directly hosted in said memory, or uploaded into said memory from an external device, or from a cloud management system communicatively accessible over the wired or wireless network by the universal control board. In one embodiment, the firmware includes first firmware instructions for communicating with a first plurality of hashboards, second firmware instructions for communicating with a second plurality of hashboards, and third firmware instructions for communicating with a third plurality of hashboards, where the first, second, and third firmware instructions operate differently from one another.

The hashboard identifiers comprise any of a sum total number of the mining chips provided on each of the plurality of hashboards, a first identifier associated with each cryptocurrency mining machine, and a second identifier associated with each of the plurality of hashboards, where the first and second identifier comprise any of a model number, a serial number, a brand name, a bin number, or a name of a manufacturer. The hashboard identifiers are prestored in any of one or more electrically erasable programmable read-only EEPROM chips, one or more erasable programmable read-only EPROM chips, or a peripheral interface controller provided on each of the plurality of hashboards. Alternatively, the hashboard identifiers are physically depicted on each of the plurality of hashboards, or on each of the cryptocurrency miners and are manually programmed into the memory of the universal control board by users.

In a further aspect, each of the plurality of electrical hashboard connectors includes a predetermined number of general purpose input-output pins, where one or more field programmable gate array chips are programmed to map the predetermined general purpose input-output pins to transmit communicating signals to each of the plurality of hashboards and retrieve the hashboard identifiers associated with each of the plurality of hashboards from either the one or more electrically erasable programmable read-only chips, the one or more erasable programmable read-only chips, or the peripheral interface controller provided on each hashboard.

The system on module circuit includes any of one or more universal asynchronous receiver-transmitter chips, or a chip peripheral interface that electrically communicate with the one or more electrically erasable programmable read-only chips, the one or more erasable programmable read-only chips, or the peripheral interface controllers, via, the general purpose input-output pins to retrieve the hashboard identifiers when each of the plurality of hashboards is electrically connected to each of the plurality of electrical hashboard connectors.

In one aspect, the interface board comprises a first interchangeable interface board including socket connectors where each socket connector includes at least 14 male pins to accommodate connectors associated with each of said plurality of hashboards. The interface board comprises a second interchangeable interface board including socket connectors, where each of the socket connectors includes at least 16 male pins to accommodate connectors associated with each of said plurality of hashboards.

The firmware includes a plurality of drivers where each of the plurality of drivers comprises programming interface instructions, where the one or more processors are selectively operated to retrieve one or more drivers based on hashboard identifiers associated with each of the plurality of hashboards, and execute the retrieved one or more drivers to communicate with and control each of the plurality of hashboards when electrically connected to each of the plurality of electrical hashboard connectors.

Advantageously, there is further included a plurality of adapters, each of the plurality of adapters including a plurality of electrical adapter connectors comprising a plurality of female ports in electrical continuity with a corresponding plurality of male pins, each of the plurality of adapters electrically connecting each of the plurality of hashboards to the plurality of electrical hashboard connectors. In one aspect, the plurality of female ports includes at least 16 female ports, and the corresponding plurality of male pins includes at least 16 male pins. In another aspect, the at least 16 female ports includes any of 18 female ports, 20 female ports, 22 female ports, and 24 female ports, and the at least 16 male pins includes any of 18 male pins, 20 male pins, 22 male pins, and 24 male pins.

Advantageously, there is further included a plurality of adapter boards, each adapter board including a plurality of electrical adapter connectors comprising a plurality of female ports in electrical continuity with a corresponding plurality of male pins, each of the plurality of adapter boards electrically connecting each of the plurality of hashboards to the plurality of electrical hashboard connectors. The plurality of female ports includes at least 16 female ports, and the corresponding plurality of male pins includes at least 16 male pins.

There is provided in another embodiment a universal control board configured to communicate with a plurality of hashboards each including a plurality of mining chips, the universal control board comprising: a system on module board comprising; a system on module circuit including one or more processors in electrical communication with memory via, a memory interface; an Ethernet circuit including an Ethernet port, the Ethernet circuit adapted to communicate with an external device over a wired or wireless network, at least one fan header, a power circuit including a power connector for receiving an external power source, a data cable connector for receiving a data cable electrically coupled to a power supply unit, and a first electrical board connector, and an interface board including a plurality of interface connectors, and a second electrical board connector, where the interface board is removeably, electrically connected to the system on module board such that the first electrical board connector electrically engages the second electrical board connector, where the system on module board electrically communicates with the interface board, and the power circuit selectively powers the interface board and the universal system on module board, and where upon operating the one or more processors, the one or more processors retrieves firmware pursuant to hashboard identifiers associated with each of the plurality of hashboards from a firmware library, and processes and executes the retrieved firmware to communicate with and control each of the plurality of hashboards when each of the plurality of hashboards are electrically connected to each of the plurality of interface connectors.

In one aspect, the interface board further includes a plurality of electrical switches comprising one or more dip switches, toggle switches, or rocker switches that are electrically coupled to the plurality of interface connectors, and the second electrical board connector, and are in electrical communication with the system on module circuit, via, the first electrical board connector, each of the plurality of electrical switches are configured to provide a binary value defining the hashboard identifiers processed by the one or more processors for retrieving the firmware.

In yet another embodiment, there is provided a universal control board configured to communicate with a plurality of hashboards each including a plurality of mining chips, the universal control board comprising: a printed circuit board including a system on module circuit including one or more processors in electrical communication with memory hosting computer-executable board instructions, via a memory interface, an Ethernet circuit including an Ethernet port for communicating with an external device over a wired or wireless network, two fan headers, a power circuit including a power connector for receiving an external power source, a data cable connector for receiving a data cable electrically coupled to a power supply unit, a plurality of interface connectors for electrically connecting the plurality of hashboards, wherein the Ethernet circuit, the fan headers, the power circuit, the data cable connector, and the plurality of interface connectors are electrically interfaced to the system on module circuit and powered by the power circuit, and where upon instructing the one or more processors to retrieve firmware instructions pursuant to hashboard identifiers associated with each of the plurality of hashboards, said one or more processors processes and executes the firmware instructions to communicate with and control each of the plurality of hashboards when each of the plurality of hashboards are electrically connected to each of the plurality of interface connectors, the firmware being hosted in the memory, on an external device, or on a cloud management system that is accessible over the wired or wireless network by the system on module circuit.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration". Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not limiting, unless the claims expressly state otherwise.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. Herein, expressions such as "have," "may have," "include," and "may include" indicate the presence of corresponding elements, such as numerical values, functions, operations, or parts, but do not preclude the presence of additional features.

The term, "cryptocurrency", or "digital currency", as used herein refers to digital or virtual currency, including but not limited to, Bitcoin, Lite coin, Doge coin, Ethereum, Ripple, Omni, Stellar, NEO, Cardano, and other digital coins.

Figure 1:
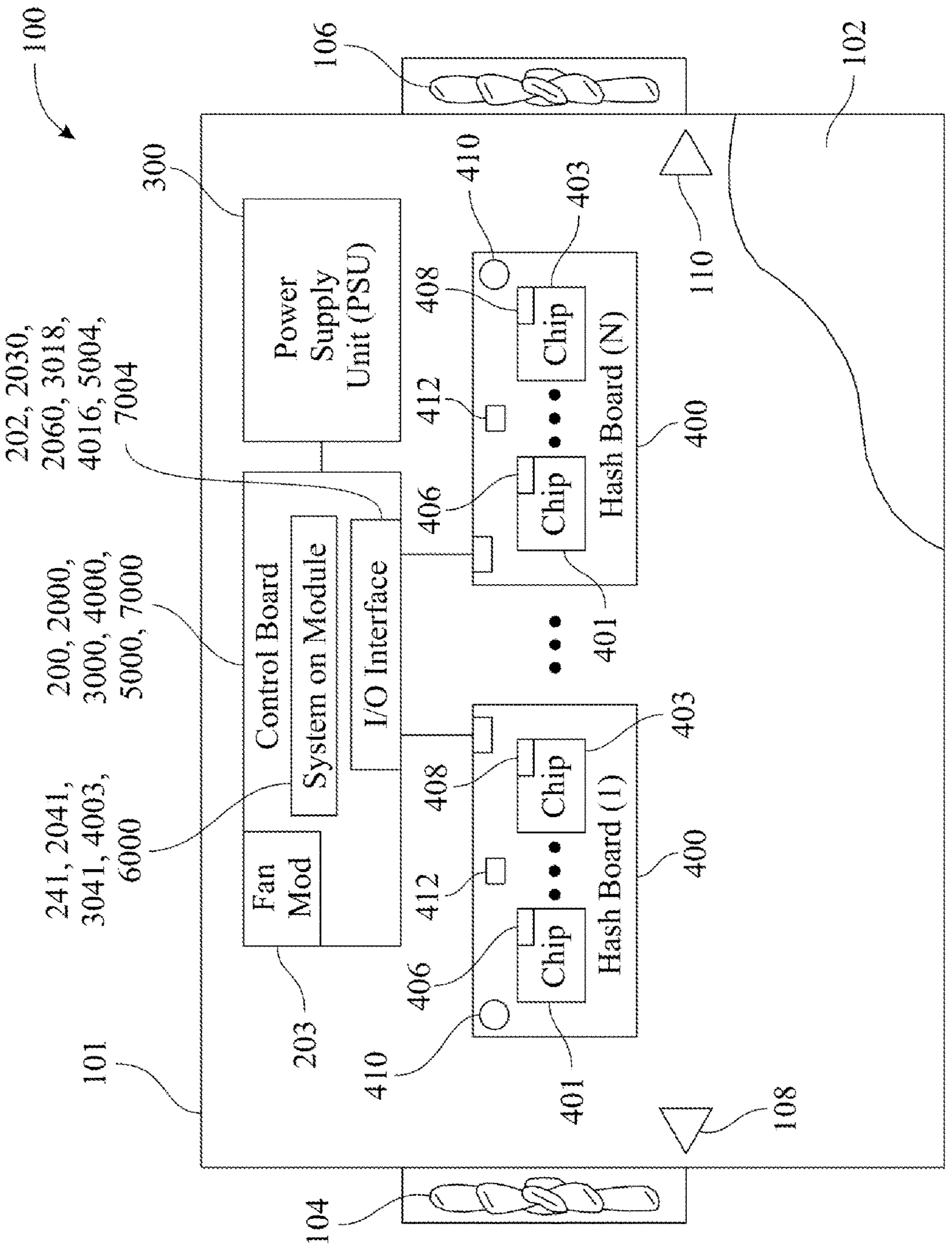
FIG. 1 is a side view of a cryptocurrency mining machine with a portion of a sidewall removed to illustrate a schematic representation of electronic components within that include a power supply unit, a universal control board including a system on module (SOM) circuit or board including one or more processor(s) and memory, an input-output interface, a plurality of hashboards each including a plurality of integrated chips, various sensors, and one or more cooling fans.

Referring now to the figures wherein like elements are represented by like numerals throughout, there is shown in FIG. 1, a side view of a cryptocurrency mining machine 100 with a portion of a sidewall 102 removed to better illustrate a schematic representation of electronic components therein. Cryptocurrency mining machine 100 includes a host of electronic components and hardware generally mounted on one or more printed circuit boards and housed within an enclosure 101. In one embodiment, there is provided a universal control board (UCB) 200, 2000, 3000, 4000, 5000, 7000 that includes a fixed input-output I/O interface 202, or alternatively, an interchangeable I/O interface board 2030, 2060, 3018, 4016, 5004, 7004, respectively, and a system on module (SOM) circuit 241, 2041, 3041, 4001, or universal system on module (USOM) board 6000 having a system on module circuit. The system on module circuit SOM includes, inter alia, a system on crystal, or a system on a chip configuration including one or more processor(s), and memory for hosting machine operating firmware, drivers, instructions, code and/or data needed to communicate with, control, and manage a plurality of hashboards 400. In one example, the one or more processors may comprise any of one or more central processing units, one or more main processing units, one or more microprocessors, digital processors, embedded processors, or microcontrollers. Memory provided in the system on module circuit 241, 2041, 3041, 4001, or on the universal system on module (USOM) board 6000 may comprise any of random access memory (RAM), dynamic access memory (DRAM), double data rate memory DDR memory, NAND memory, static access memory (SRAM), flash memory, or electronic programmable memory (EPROM, EEPROM). Further, there may be provided external memory comprising a memory card such as an SD card, hard drive, server, or other external memory device. A memory interface is provided for the one or more processors to communicate with memory. There is also provided a power supply unit (PSU) 300 that comprises the necessary power supply circuitry for powering the electronic hardware components. PSU 300 may include for example, step-down transformers, voltage regulators, filters, fuses, and other electronics for generating, and delivering a regulated, output voltage supply to all electronic components, via a power connector 212 shown in FIG. 2, as one example. The PSU 300 may include voltage measuring or monitoring circuitry for measuring or monitoring power and/or supply voltage and/or current that is delivered during a start-up chip voltage phase when powering IC mining chips 401, 403 to alert users when voltage power supply is not functioning properly. Further housed within the enclosure 101 are a plurality of hashboards 400, each comprising the same type and/or model, and each including a plurality of integrated chips (IC) 401, 403 that may each include a temperature sensor 406, 408, board temperature sensors 410, and an optional peripheral interface controller (PIC) 412 for electrically communicating with the system on module circuitry, or system on module board 6000. It is appreciated that the number of hashboards 400 and IC chips 401, 403 depicted are for illustrative purposes only, and that cryptocurrency mining machines 100 may comprise any number of hashboards each having any number of IC chips. In one illustrative embodiment, each IC chip 401, 403 comprises an application-specific integrated circuit (ASIC) including a secure hash algorithm (SHA-256, SHA-256D) for mining a specific digital currency, such as bitcoin. ASIC chips provide smaller volume, lower power consumption, and enhanced reliability. In one alternative embodiment, ASIC chips may be replaced with field programmable gate array chips (FPGA), or Graphic Processing Unit chips (GPU), or any combination thereof. For example, each hashboard 400 may include up to 150 ASIC chips. Users may employ and program FPGA chips with different algorithms depending on the digital currency being mined. Cooling fans 104, 106 are powered to draw heat away from the electronic components including the IC chips, alternatively, miners are submerged in a cooling liquid for cooling the IC chips 401, 403 provided on hashboards 400.

Certain operating parameters generally impact the functionality, and operating efficiency of cryptocurrency mining machines. For example, high operating temperatures may compromise the operating performance of ASIC chips and/or hashboards, potentially causing damage if not managed properly. To better address this concern, cryptocurrency mining machines 100 typically includes a variety of sensors, and\or detectors for continuously monitoring the temperature of the IC chips, the temperature of hashboards, rotational direction and/or speed of fans, the internal temperature of the enclosure, and environmental temperature all preferably in real-time. As such, in one embodiment, each hashboard 400 includes one or more board temperature sensors 410. One or more environment temperature sensors (not shown) may be affixed to the internal area of the enclosure for measuring the inner temperature of the mining machine. Further, on-chip temperature sensors, denoted at 406, 408 are also employed to measure the temperature of each ASIC chip 401, 403 at start-up, and during operation. Each on-chip temperature sensor may comprise miniature thermocouples, resistance temperature detectors, thermistors, or other semi-conductor based integrated circuits. It is appreciated that any number of temperature sensors or detectors can be implemented to measure various temperatures, or other characteristics such as humidity associated with cryptocurrency mining machine 100. In one embodiment, fan sensors 108, 110 are also provided to measure, or detect the rotational speed of the fans. Such fan sensors may comprise encoders, motion detectors, or voltage/current circuitry. The fan sensors electrically communicate with the fan control module 203 provided on the universal control board 200. The fan control module 203 comprises a pulse width modification circuit PWM for monitoring, measuring, and dynamically controlling the speed of fans 104, 106 to better manage the temperature of ASIC chips 401, 403, and/or hashboards 400 to prevent damage, and overheating. Sensors 108, 110, 406, 408, 410 are all in electrical communication with universal control board 200, directly or via, each corresponding PIC 412.

Figure 2:
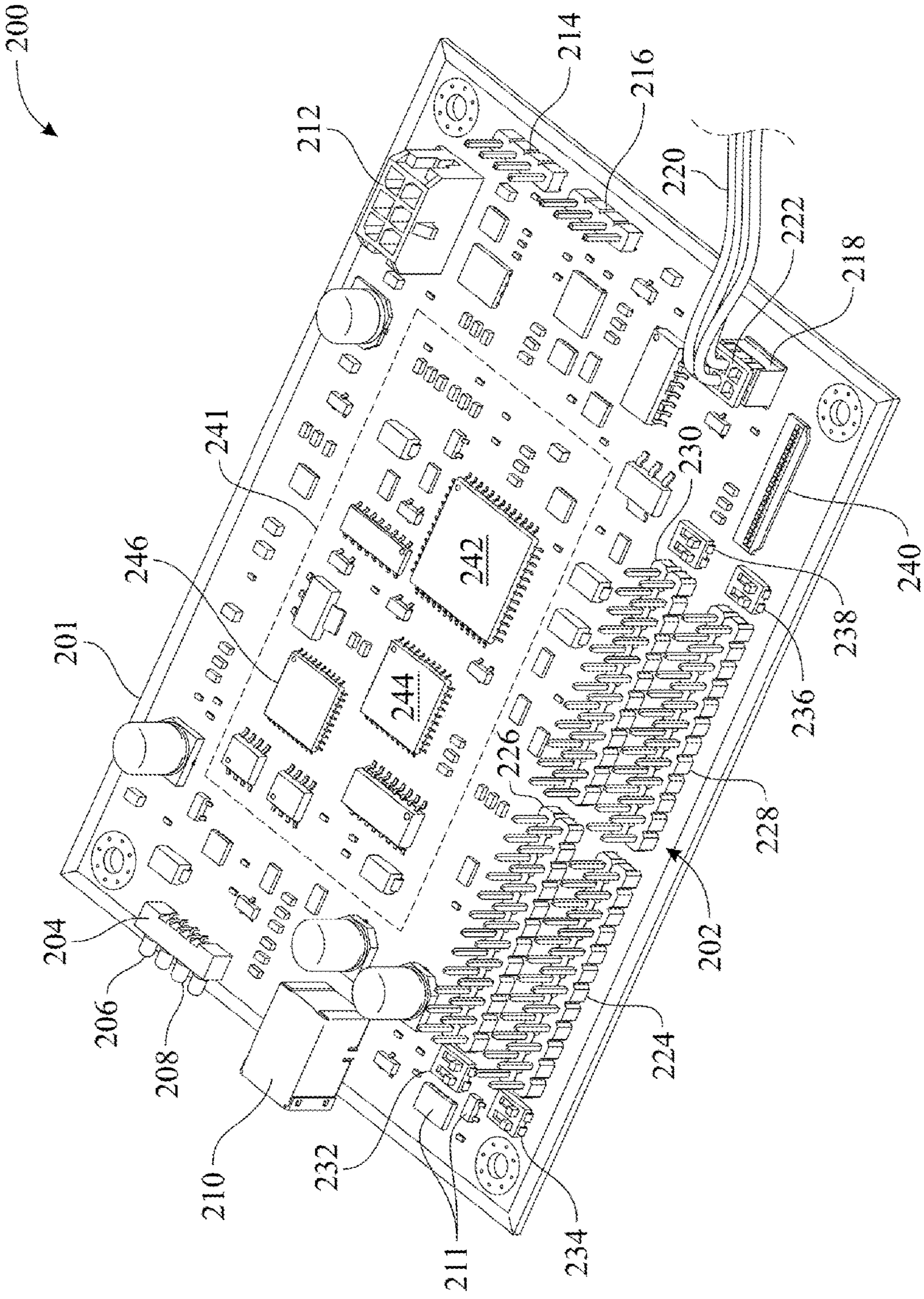
FIG. 2 is a top, perspective view of the universal control board including a first plurality of interface connectors defining an input-output interface, and a system on module (SOM) circuit for electrically connecting, communicating with, and controlling a plurality of hashboards, in accordance with one embodiment of the present invention.

Turning now to FIG. 2 there is shown a top, perspective view of a universal control board (UCB) 200 for communicating with, managing, and controlling a plurality of hashboards 400, in accordance with one embodiment of the present invention. In one functional arrangement, UCB 200 generally includes a host of electronic components that comprise, but is not limited to, an indicator status block 204 comprising one or more light emitting diodes (LEDs) 206, 208 that are controlled by the one or more processors to visually indicate various operating conditions, status, or metrics of the UCB 200 including for example, any loss of power, indication of improper electrical configuration or connection of the hashboards to the UCB 200, loss of Ethernet network connection, or to identify certain metrics such as faulty IC chips 401, 403, faulty hashboards 400, condition status of programmable interface controller (PIC 412), improper operating temperature ranges associated with IC chip temperatures, or temperature of hashboards, or other conditions or operating factors that are often monitored during cryptocurrency mining operations. Although four diodes are depicted, it is appreciated that any number of LEDs may be employed. Such LEDs 206, 208 may be turned on or off, powered on and/or off for a predetermined time period, or powered on with at different power levels to provide different light intensities. There is also provided an Ethernet network interface circuit that includes an Ethernet port connector 210 for remotely communicating with the mining machine 100 over a communication wired or wireless network, via, a remote client device such as desktop or laptop computer, a tablet, or a smartphone. It is understood that the Ethernet network interface circuit allows users to electrically communicate with each mining machine 100. Users may remotely transfer, download, and upload data, drivers, and/or firmware, or firmware upgrades to each mining machine 100, remotely monitor the machine operating metrics such as temperature, power use, voltage and frequency applied to IC chips 401, 403, communicate with hashboards 400 via, PIC 412 to identify types of hashboards connected, and to control and manage voltage and frequency of each IC mining chip 401, and 403. The Ethernet network circuitry also allows each mining machine 100 to communicate with any external network, data storage system, data exchange, server, or cloud based management system, and to communicate with each other as well. The network circuitry may include any well-known Ethernet IC controller 211 provided on the UCB 200. The IC controller 211 may comprise a processor unit memory modules, communication interfaces, and peripherals such as an MCU/FPGA. Examples of Ethernet IC chips may include the ENC28J60/SP, WS100, or W5500, manufactured by Microchip™, and WizNet™. The Ethernet port 210 may comprise an RJ-45 connector. In another embodiment, the UCB 200 may include wireless technology to communicate with remote devices, servers, or the cloud. The wireless technology may include transmitters, transceivers, receivers, transponders, or any combination thereof to effectuate operating over a wireless network such as 4G, 5G, ZigBee, or Bluetooth.

UCB 200 further includes a power connector denoted at 212 for electrically coupling the control board to power supply unit PSU 300, via a power cable (not shown), for suppling DC voltage, such as 12 volts, and up to 300 amps, to the electronic components provided on the UCB 200. In one example, the power connector 212 may comprise a Molex™ power connector.

One or more fan headers 214, 216 are also provided on the UCB 200 for electrically connecting, and controlling the operation of cooling fans 104, 106, as depicted in FIG. 1. In one embodiment, each fan header 214, 216 is designed to accommodate either a standard two-wire, on/off fan connection configuration, or alternatively, allow data communication between the UCB 200 and fans 104, 106 for providing pulse width modulation (PWM) control of the fans, via fan module 203 that provides pulse-width modulation circuitry generally defined by transistors, inductors, capacitors, resistors, and designated integrated circuits for controlling the speed of fans 104, 106 to effectively cool IC chips 402, 404, and/or hashboards 400 provided within the mining machine 100. In one exemplary embodiment, each fan header 214, 216 comprises four (4) male pins, though only two male pins may be electrically active for a simple on/off control of the fans. It is appreciated that any number of fan headers may be provided on the UCB 200 to accommodate controlling any number of fans, and each fan header 214, 216 may comprise any number of male, female or other electrical connectors or pins. Temperature of the ASIC chips 401, 403, and/or hashboards 400 is effectively managed by a variety of cooling methods preconfigured by users. One method comprises a fan only cooling method where fans 104, 106 are operated at a preset speed to cool ASIC chips 401, 403, and/or hashboards 400 regardless of the temperature of ASIC chips, and/or hashboards. In one embodiment, users can manually preset a percentage of PWM signal where the applied firmware automatically provides the necessary instructions and/or computer code to communicate with UCB 200 for electrically configuring the fan control module 203 to deliver a controlled PWM signal for controlling the speed of fans 104, and 106. Alternatively, the applied firmware used to control and manage the UCB 200 can automatically control the fans via, PWM to cool the ASIC chips on each hashboard 400, based on the temperature of the ASIC chips detected.

As illustrated in FIG. 2, the main PCB 201 further includes a power data connector 218, for receiving a data connector 222 provided at the distal end of data cable 220. The system on module circuit 241 can electrically communicate with PSU 300, and with PIC 412 that may be provided on each hashboard 400, and instruct the PSU 300 to generate and deliver voltage, at a predetermined value, to each hashboard 400, via, a bus bar arrangement (not shown).

With continued reference to FIG. 2, UCB 200 also includes a plurality of interface connectors 224, 226, 228, 230 that define an input-output I/O interface 202 for electrically connecting a plurality of hashboards 400 thereto. As shown in one exemplary embodiment, there is provided a total of four (4) interface connectors 224, 226, 228, 230 oriented in a two-by-two parallel configuration on printed circuit board 201 to accommodate electrically connecting four (4) hashboards 400 where each hashboard comprises the same type and/or model which may be deemed a first plurality of hashboards. In one exemplary embodiment, each interface connector comprises 24 (12×2) male pins. It is appreciated that any number of interface connectors may be employed, and oriented on UCB 200 in any arrangement, or configuration. Further, each interface connector 224, 226, 228, 230 may comprise any number of electrically connecting male pins, female ports, sockets, board-to-board connectors, or plug-in connectors.

UCB 200 further includes a system on module SOM circuit 241 that is graphically represented within dotted lines. The SOM circuit 241 may comprise a system on a chip SOC 242 or system on circuit configuration that includes one or more FPGA chips, internal controller, and one or more processors, one or more DDR memory chips 244, and one or more NAND memory chips 246. In one embodiment, SOM circuit 241 integrates a core ARM® Cortex™-A9 based processing system (PS) and 28 nm Xilinx programmable logic (PL aka FPGA) in a single device. The ARM Cortex-A9 CPUs are the heart of the PS and also include on-chip memory, external memory interfaces, and a rich set of peripheral connectivity interfaces. SOM circuit 241 provides an ideal system for performing a hosts of different tasks. For example, ARM core solves complex and nested tasks meanwhile FPGA solves tasks which require very fast execution or calculation (SHA-256, for instance). The one or more FPGA chips of SOM circuit 241 provides flexibility in mapping general purpose input-output GPIO pins. That simplifies development of SOM circuit 241, and provides potential opportunity to prevent reengineering or redeveloping circuitry if another function is needed in the future for certain electrical connection pins, or configurations. One or more programmable FPGA chips and circuitry provides system flexibility for mapping general-purpose (GPIO) pins while employing bi-directional serial communication I2C bus to communicate with (write/read data) the EEPROM or PIC provided on each connected hashboard 400. A universal asynchronous receiver/transmitter (UART) chip and circuitry is also employed to electrically communicate with IC chips 401, 403 on the hashboards. Alternatively, a special peripheral interface (SPI) can also be implemented to communicate with IC chips 401, 403 provided on electrically connected hashboards as well. It is appreciated that other integrated chips may be employed in the SOM 241 including for example, Xilinx Zynq7000 with FPGA, Allwinner A40i-H, STM32MP1 series, one or more MCU chips including processor unit, memory modules, communication interfaces, and any peripherals, and memory protection unit MPU chips. Alternatively, specifically designed non-standard interfaces used with FPGA technology can also be engineered to communicate with EEPROM, PIC, or with the IC chips. In one example, SOM circuit 241 may include an ARM CPU with FPGA using DDR memory and NAND memory where DDR memory can be accessed by both a central processing unit and FPGA. In another embodiment, the SOM circuit 241 may employ an ARM core CPU with a memory management unit, I/O interfaces, and DDR, and NAND memory. The memory management unit is a special contoller used for running Linux. The one or more processors may comprise a central processing unit, a microprocessor, or a microcontroller.

UCB 200 is designed to effectively identify the type and/or model of hashboard 400 that is electrically connected to I/O interface 202 in order to retrieve and implement the correct firmware/drivers needed to efficiently communicate with, and control each electrically connected hashboards. In one embodiment, this approach is accomplished by use of electrical switches denoted at 232, 234, 236, and 238. In one embodiment, electrical switches 232, 234, 236, 238 comprise DIP switches, rocker switches, or toggle switches. In one preferred embodiment, there are provided DIP switches that are each preconfigured by users to provide variable data inputs for manually assigning hashboard identifiers to each electrically connected hashboard 400. Such hashboard identifiers may correspond to, or are associated with, particular brands, makes, models, or types of hashboard 400, 402, 404, 414 connected. Each hashboard identifier corresponds to a particular firmware, driver, and/or software program for managing and controlling the connected hashboards. The data variable inputs represent binary values associated with voltages and/or data signals generated, received, and processed by SOM circuit 241. In one example, each DIP switch 232, 234, 236, 238 comprises a double-toggle DIP switch for providing a variable data input comprising binary values of 00, 01, 10, and 11. When each toggle of each double-toggle DIP switch 232, 234, 236, 238 is set to an OFF position, a voltage signal, associated with a binary value of 00, is received and processed by, the SOM circuit 241 to generate a hashboard identifier associated with a 00 binary value. For example, a binary value of 00 may correspond to a first voltage value corresponding to a hashboard identifier associated with a S17 hashboard. When each toggle of each double-toggle DIP switch 232, 234, 236, 238 is set to an ON position, a voltage signal, associated with a binary value of 11, is received and processed by SOM 241 to provide another hashboard identifier associated with hashboard comprising a different type and/or model or make. For example, a binary value of 11 may correspond to a second voltage value corresponding to a hashboard identifier associated with a S19 hashboard. Manipulating each double-toggle DIP switch 232, 234, 236, 238 provides additional binary values of 01 and 10 to provide different voltage values each corresponding to different hashboard identifiers associated for example with a S19 Pro hashboard, or a L3 hashboard. Incremental increases in the number of toggles provided on each DIP switch correlates to an increase in variable data input variables, and a larger number of hashboard identifiers thereby accommodating electrically connecting different pluralities of hashboards to the UCB 200, if desired, where each plurality of hashboards, or each group of hashboards connected comprises the same type and/or model of hashboard. The hashboard identifiers correlate to the specific firmware, driver, or software app needed to communicate with, manage, and control electrically connected hashboards to UCB 200. Thus, in one example, setting each DIP switch 232, 234, 236, 238 to a binary value of 00 provides a hashboard identifier corresponding to a S17 hashboard, signifying that there are four S17 hashboards electrically connected to the I/O interface 202, where SOM circuit 241 retrieves and implements the necessary firmware/drivers associated with S17 hashboards allowing the UCB 200 to communicate with, control and manage the S17 hashboards. Thus, in another example, setting each DIP switch 232, 234, 236, 238 to a binary value of 01 provides a hashboard identifier corresponding to a S19Pro hashboard, signifying that there are four S19Pro hashboards electrically connected to the I/O interface 202, where SOM circuit 241 retrieves and implements the necessary firmware/drivers associated with S19Pro hashboards allowing the UCB 200 to communicate with, control and manage the S19Pro hashboards. Users can visually inspect the plurality of hashboards connected to the UCB 200, and manually set each DIP switch to the same proper binary value where voltage signals attributed to the binary settings are processed by the one or more processors on the SOM circuit.

In one embodiment, an I/O display or monitor connector 240 may also be provided to accommodate a visual display (i.e. LCD monitor, Graphic User Interface GUI) to the UCB 200. The monitor or GUI may be used to visually monitor data or information relating to any of: the type of firmware and/or driver stored or retrieved, machine metric data, power consumption, temperature of mining chips 402, 404, temperature of the plurality of hashboards 400, environmental temperature, speed of cooling fans 104, 106, percentage of PWM provided to control the cooling fans, voltage and frequency values of mining chips, hash rates, mining pool information, or other status conditions. Connector 240 may be configured to accommodate any type of connector including but not limited to, USB-C, HDMI V1.2 or V1.3, display port, mini-display port, digital visual interface (DVI), mini DVI, Parallel, Serial, PS/2, or VGA.

UCB 200 may include additional features and elements such as, but not limited to, one or more embedded multimedia cards, or SD cards for installing software, firmware, or drivers, and for use as storage, one or more universal bus interfaces (USB) or USB-C for installing software, firmware, for storage, or for debugging issues relating to the UCB 200, JTAG, or UART connections for debugging, and interfacing with UCB 200.

Turning now to FIGS. 3A through 3D there are shown perspective views of adapters 500, 600, 700, 718 for further accommodating electrically connecting a plurality of hashboards having different pin layouts or configurations to a universal control board. Each adapter 500, 600, 700, 718 is shown readily connectable to a corresponding ribbon connector 508, 608, 708, 726 associated with ribbon cables 511, 611, 711, 729 respectively, that are each electrically coupled to different types and/or models of hashboards such as a first type and/or model 400, a second type and/or model 402, a third type and/or model 404, and a fourth type and/or model 414 hashboard. Adapters 500, 600, 700, 718 allow operators to electrically connect different pluralities of hashboards either a first plurality of hashboards 400, or a second plurality of hashboards, 402, or a third plurality of hashboards 404, or a fourth plurality of hashboards 414 to interface connectors 224, 226, 228, 230 of I/O interface 202 on UCB 200 without having to revamp, reengineer, or redesign a variety of different control boards having different connection pin configurations. In one embodiment, each adapter 500, 600, 700, 718 includes a plurality of electrical connectors comprising a number of female ports 502, 504, 602, 604, 702, 704, 720, 722, where each female port is in electrical continuity with a corresponding male pin 505, 506, 605, 606, 705, 706, 723, 724, respectively. In one embodiment, each adapter 500, 600, 700 comprise 24 (12×2) female ports for electrically connecting to, and receiving each male pin provided on each interface connector 224, 226, 228, and 230. Adapter 718 however, comprises 20 (10×2) female ports which is described in reference to FIG. 18. One difference between each adapter 500, 600, 700, 718 is the number of male pins 505, 506, 605, 606, 705, 706, 720, 722 that are provided for electrically interfacing respective ribbon connectors 508, 608, 708, and 726. For example, adapter 500 includes 24 (12×2) male pins 505, 506 for electrically mating with 24 (12×2) female ports 510 provided on ribbon connector 508, adapter 600 includes 20 (10×2) male pins for electrically engaging 20 (10×2) female ports 610 provided on ribbon connector 608, adapter 700 includes 18 (9×2) male pins 705, 706 for electrically engaging 18 (9×2) female ports 710 provided on ribbon connector 708, and adapter 718 includes 16 (8×2) male pins 723, 724 for electrically engaging 16 (8×2) female ports 728 provided on ribbon connector 726. As such, adapters 500, 600, 700, 718 provide the convenience of electrically connecting different pluralities of hashboards 400, 402, 404 to the UCB 200 without the need for employing different control boards to communicate with, and control the different pluralities of connected hashboards. In practice, a first plurality of hashboards may comprise hashboards that utilize an 18 pin (9×2) connection configuration, while another plurality of hashboards may comprise hashboards that utilize a 20 pin (10×2) connection configuration depending on the brand, make, model and/or type of hashboard employed. It is noted that for convenience, each adapter 500, 600, 700, 718 has at least the same number of female ports 502, 504, 602, 604, 702, 704, 720 722, respectively, as that of male pins provided on each interface connector 224, 226, 228, 230, of the I/O interface 202. In cases where an adapter 600, 700, 718 includes a lesser number of male pins for electrically accommodating a ribbon connector having a lesser number of female ports associated with a particular type of hashboard, there are certain female ports 614, 616, 714, 716, 732, 734 for example, on each adapter 600, 700, 718, respectively, that are void of electrical continuity with a corresponding male pin. It one alternative embodiment, there may be provided a single adapter 500 for use with a different plurality of hashboards where a certain number of female ports and corresponding male pins simply remain inactive or void and dormant without any data signals, communication, current, or voltage flowing there through. It is understood that each adapter 500, 600, 700, 718 may also comprise different types of electrical connectors. For example, female ports may be replaced with male pins, and vice-versa, or each adapter 500, 600, 700, 718 may comprise only female ports, or only male pins depending on the type of interface connector employed on UCB 200. Further, each adapter 500, 600, 700, 718 may comprise any number of different types of electrical connectors including for example, plug-ins, board-to-board connectors, wire-to-board connectors, bayonet connectors, or soldered connections, or socket connectors.

Figure 4:
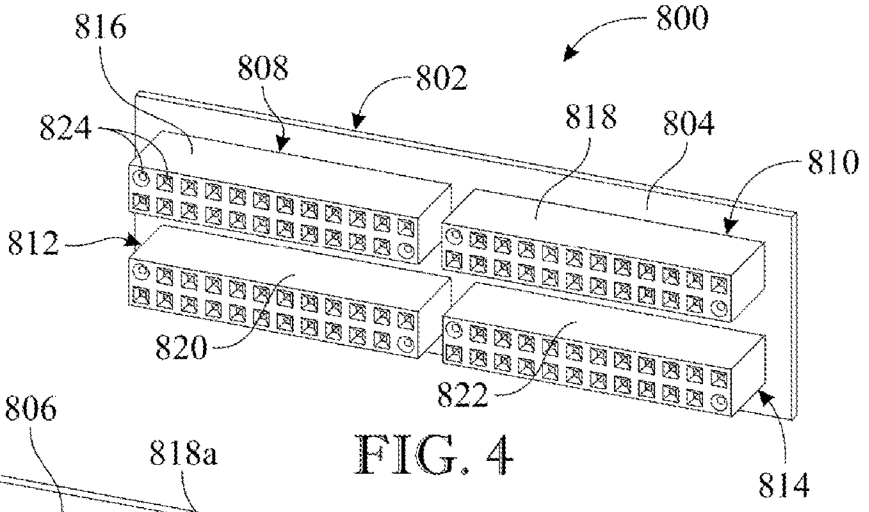
FIGS. 4 and 5 are front and back perspective views, respectively, of a first adapter board for electrically connecting a first plurality of hashboards to a first plurality of interface connectors provided on the universal control board of FIG. 2.
Figure 5:
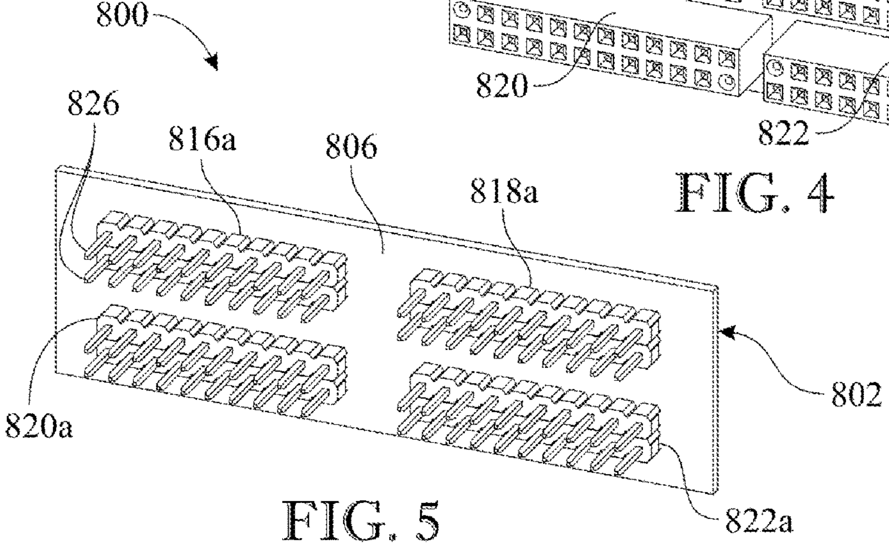
Figure 10:
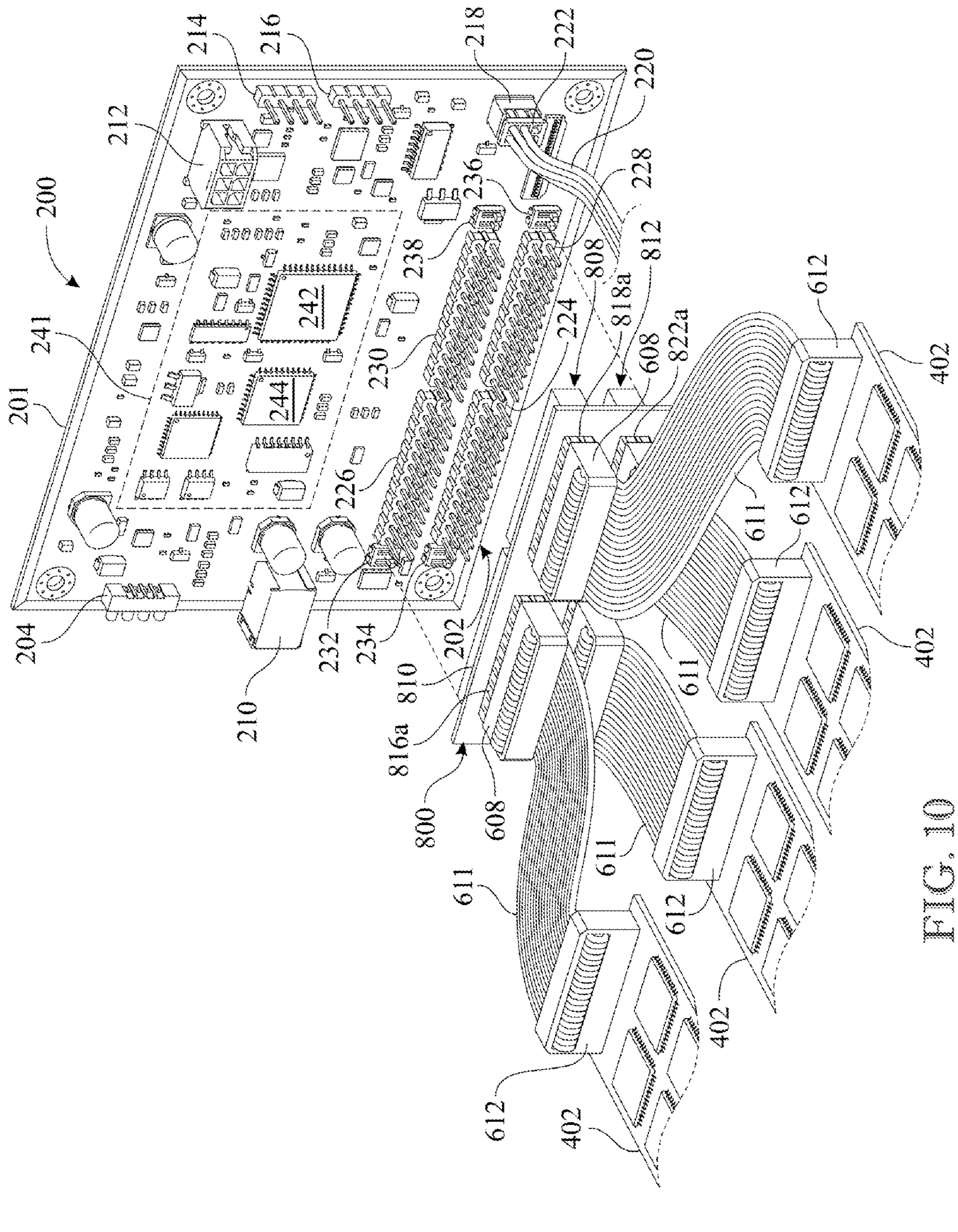
FIG. 10 illustrates a perspective view of the universal control board of FIG. 2, showing each of the first plurality of hashboards electrically connected to electrical connectors provided on the first adapter board of FIGS. 4 and 5 that is readily attachable to the input-output interface on the universal control board.

With reference now made to FIGS. 4 and 5, there are shown a front and back perspective view, respectively, of a first adapter board 800 for electrically connecting a plurality of hashboards 402 each comprising the same model and/or type, simultaneously to interface connectors 224, 226, 228, 230 of the I/O interface 202 provided on UCB 200, as better illustrated in FIG. 10. The ability to simultaneously connect, and disconnect a plurality of hashboards 402, to and from UCB 200, allows operators to quickly replace a defective or damaged UCB 200 with ease, or to efficiently and quickly configure a miner, thereby reducing the down time of mining machines during repair or hashboard replacement, or during initial setup. The first adapter board 800 comprises a printed circuit board (PCB) 802 generally comprising any geometrical shape but preferably includes a square or rectangular shape having a first side 804 directly opposite a second side 806, as shown. Electrical adapter connectors 808, 810, 812, 814 are configured on PCB 802 such that a first end 816, 818, 820, 822 comprising a plurality of female ports 824, extends outwards from the first side 804, and a second base end 816*a*, 818*a*, 820*a*, 822*a* of each electrical connector extends outwards from the second side 806, as shown in FIG. 5, where the second base end 816*a*, 818*a*, 820*a*, 822*a* includes a plurality of male pins 826 in electrical continuity with corresponding female ports 824. In one embodiment, each electrical adapter connector 808, 810, 812, 814 includes 24 (12×2) female ports 824 of which 20 (10×2) are in electrical continuity with 20 (10×2) male pins 826, leaving 4 female ports void of a corresponding male pin, and operatively inactive.

Figure 6:
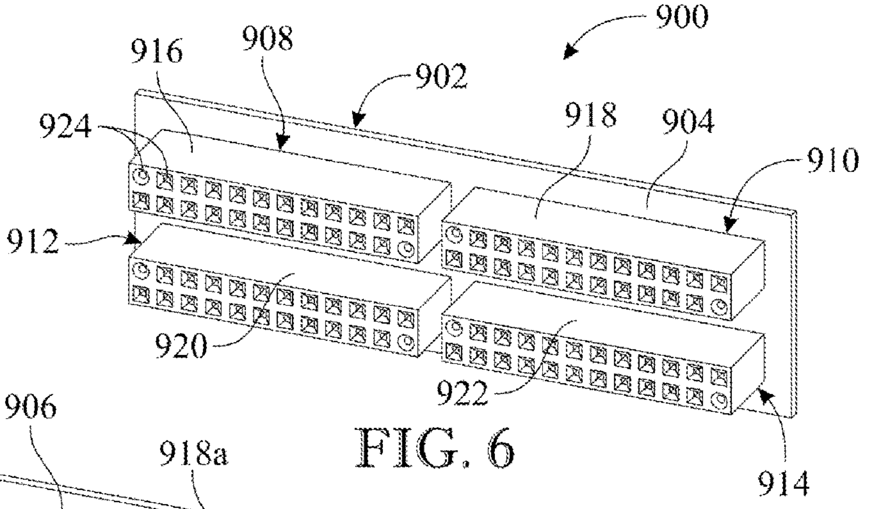
FIGS. 6 and 7 are front and back perspective views, respectively, of a second adapter board for electrically connecting a second plurality of hashboards to the first plurality of interface connectors provided on the universal control board of FIG. 2.
Figure 7:
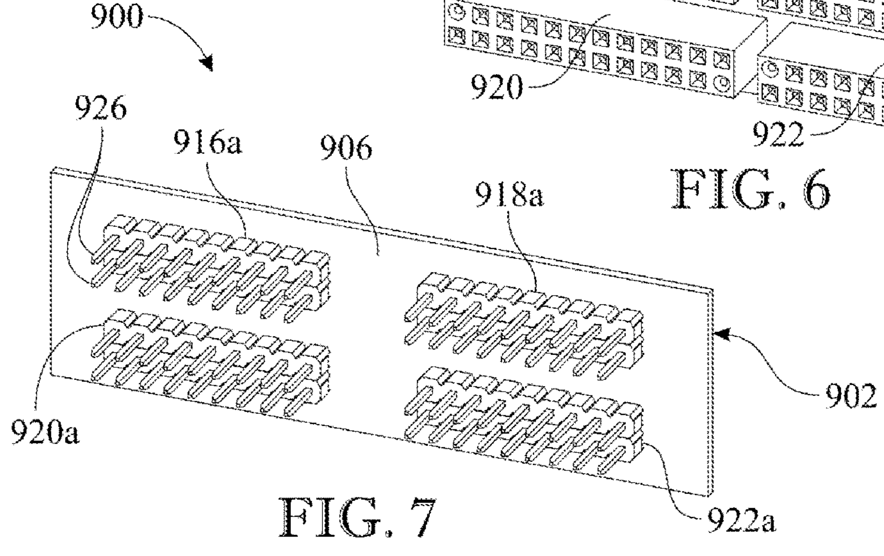

In reference to FIGS. 6 and 7, there are shown a front and back perspective view, respectively, of a second adapter board 900 for electrically connecting a different plurality of hashboards 402 to interface connectors 224, 226, 228, 230 of the I/O interface 202, in accordance with another embodiment. The second adapter board 900 differs from the first adapter board 800 in that there are less electrical male pins provided to accommodate electrically receiving and connecting a plurality of hashboards each having a different connection configuration requiring less male pins. Adapter board 900 includes a printed circuit board PCB 902, similar to that of board 800, having a first side 904 directly opposite a second side 906, as shown. Each electrical adapter connector 908, 910, 912, 914 is mounted to the PCB 902 such that a first end 916, 918, 920, 922 including a plurality of female ports 924 extends outwards from the first side 904, as shown in FIG. 6, and a second base end 916*a*, 918*a*, 920*a*, 922*a* including a plurality of male pins 926 in electrical continuity with the plurality of female ports 924, extends outwards from the second side 906 of the PCB 902, as shown in FIG. 7. In one embodiment, each electrical adapter connector 908, 910, 912, 914 includes 24 (12×2) female ports 924 of which 18 (9×2) female ports are in electrical continuity with 18 (9×2) male pins 926, leaving 6 female ports void of a corresponding male pin, and operatively inactive. As shown in FIGS. 4 through 7, in one configuration, electrical adapter connectors 808, 810, 812, 814, and 908, 910, 912, 914, are oriented in a two-by-two configuration designed to take up less space on the UCB 200 when electrically connecting a plurality of hashboards 402 to interface connectors 224, 226, 228, 230 of the I/O interface 202, as better illustrated in FIG. 10.

Figure 8:
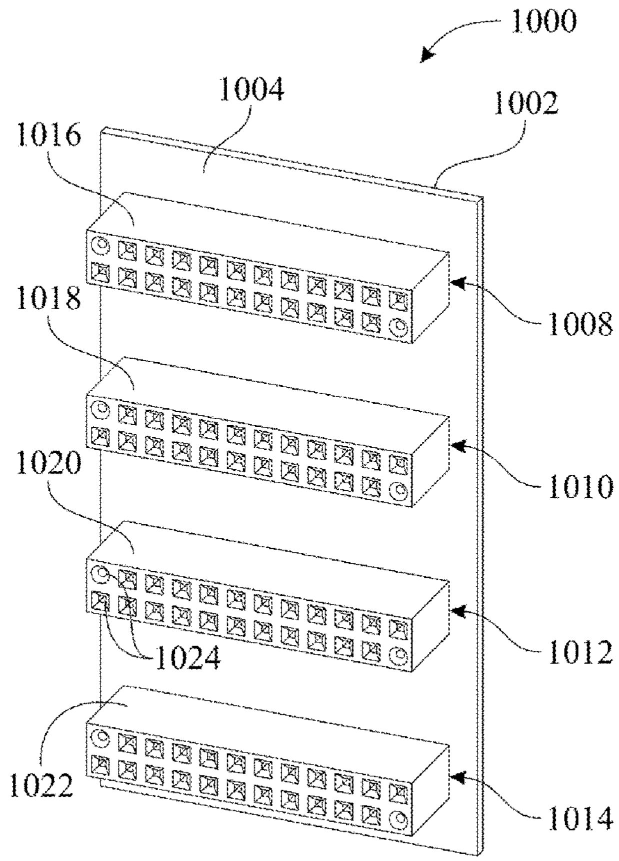
FIGS. 8 and 9 are front and back perspective views, respectively, of a third adapter board for electrically connecting a third plurality of hashboards to the first plurality of interface connectors provided on the universal control board of FIG. 2.
Figure 9:
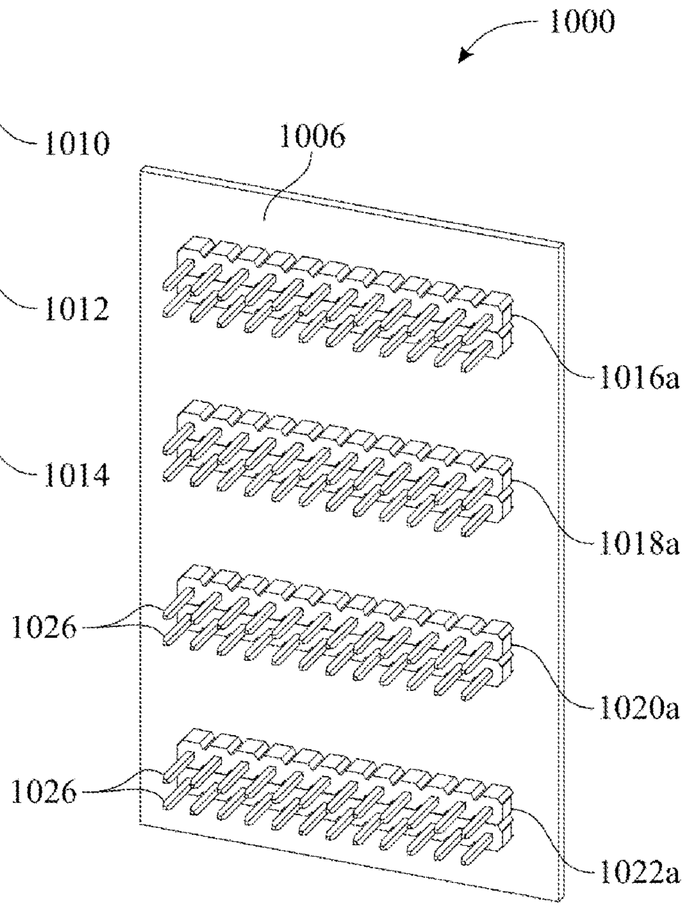

As illustrated in FIGS. 8 and 9, there are shown front and back perspective views, respectively, of a third adapter board denoted at 1000 for electrically connecting a plurality of hashboards to interface connectors 224, 226, 228, 230 of UCB 202, in accordance with another embodiment. The third adapter board 1000 differs from adapter boards 800, 900 in that each individual electrical adapter connector 1008, 1010, 1012, 1014 comprises 24 (12×2) female ports 1024 each in electrical continuity with 24 (12×2) corresponding male pins 1026, and each electrical adapter connector 1008, 1010, 1012, 1014 is oriented one on top of each other along a vertical axis, on a printed circuit board PCB 1002. Adapter board 1000 includes a printed circuit board PCB 1002, similar to that of boards 800, 900, having a first side 1004 directly opposite a second side 1006, as shown. Each electrical adapter connector 1008, 1010, 1012, 1014 is mounted to the PCB 1002 such that a first end 1016, 1018, 1020, 1022, each including a plurality of female ports 1024, extends outwards from the first side 1004, as shown in FIG. 8, and a second base end 1016*a*, 1018*a*, 1020*a*, 1022*a*, each including a plurality of male pins 1026 in electrical continuity with the plurality of female ports 1024, extends outwards from the second side 1006 of the PCB 1002, as shown in FIG. 9. The particular orientation of electrical adapter connectors 1008, 1010, 1012, 1014 provided on PCB 1002 provides another configuration designed to take-up less space on the UCB 200 when electrically connecting a different plurality of hashboards to the interface connectors 224, 226, 228, and 230. Each electrical adapter connector 808, 812, 814, 816, 908, 912, 914, 916, 1008, 1010, 1012, 1014 may comprise any different type of electrical adapter connector. For example, female ports may be replaced with male pins, and vice-versa, or may comprise only female ports, or only male pins depending on the type of interface connector used on the universal control board 200. Further in one embodiment, each interface adaptor 500, 600, 700, 718 and each individual electrical adapter connector 808, 812, 814, 816, 908, 912, 914, 916, 1008, 1010, 1012, 1014 may include one or more female ports that are different in physical structure, shape, or configuration to accommodate receiving a male metal pin, metal conductor, or an electrical conductive male structure having a similar, corresponding, physical shape to assure proper and correct aligned physical connection. Each adapter 500, 600, 700, 718 and each adaptor board 800, 900, 1000 may comprise markings, indicia, protrusions, indentations, or other physical characteristics to better assist or instruct operators when attaching and aligning the use of each adapter 500, 600, 700, and/or interface adapter board 800, 900, 1000 to each interface connector 224, 226, 228, 230 of I/O interface 202. Further, each adapter board 800, 900, 1000 may include apertures or openings to accommodate fasteners for securely mounting the adapter boards to the UCB 200 via, mounting posts. Alternatively, each adapter board 800, 900, and 1000 may be secured to the universal control board 200 using mounting clips allowing for quick removal and replacement of the UCB 200, and/or adapter boards without the need or use of tools.

Figures 3A, 3B, 3C, 3D:
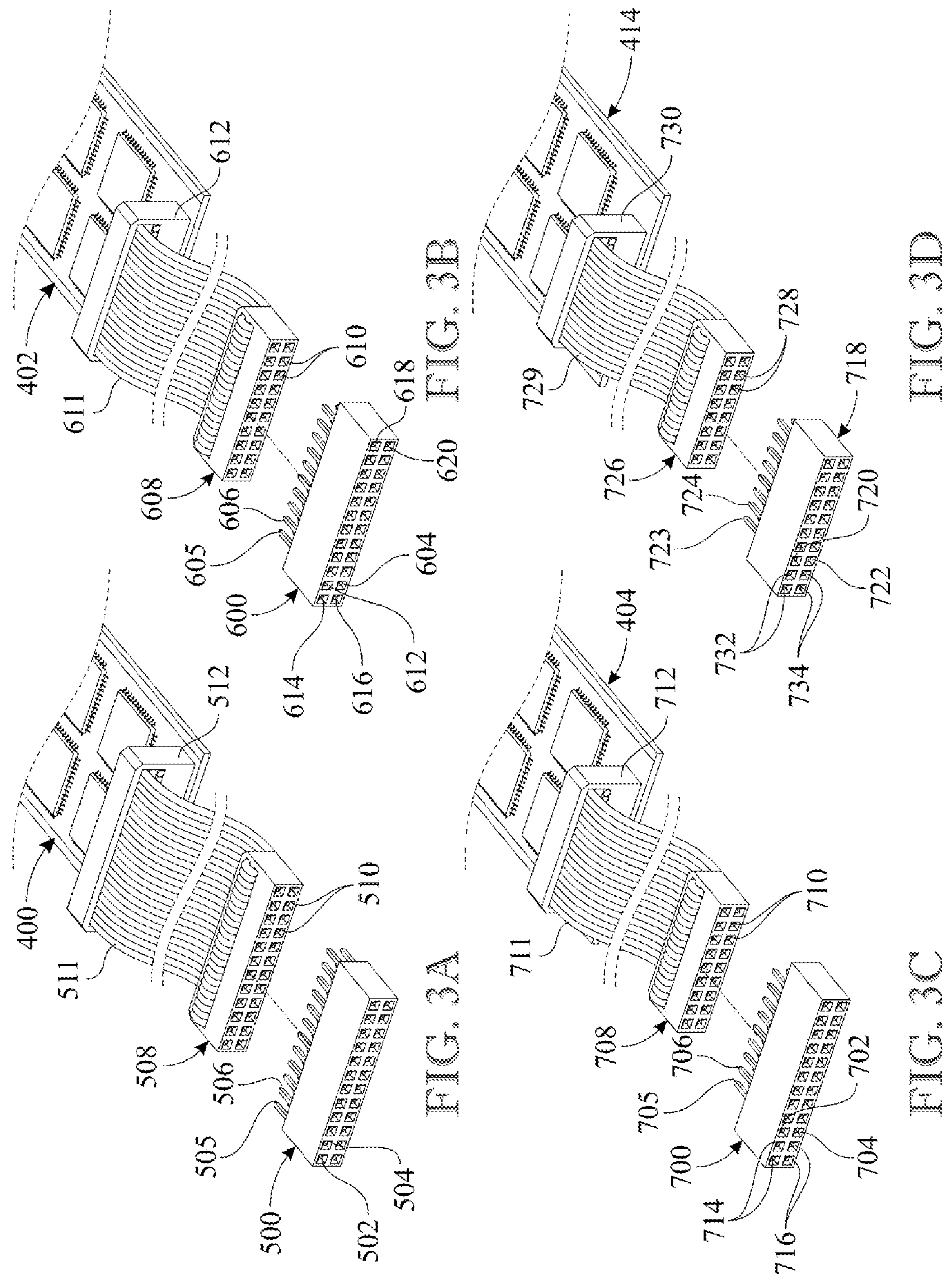
FIGS. 3A through 3D are perspective views of various adapters for electrically connecting a plurality of hashboards, via, a ribbon connector associated with a ribbon cable attached to a corresponding hashboard, to the plurality of interface connectors provided on the universal control board of FIG. 2.

Referring now to FIG. 10, there is shown a front perspective view of the UCB 200, and a first plurality of hashboards 402 each comprising the same model and/or type, and each readily connected to the I/O interface 202 of the UCB 200, via adapter board 800, as illustrated in FIGS. 4 and 5. Each hashboard 402, as depicted in FIG. 3B, is electrically connected to adapter board 800 via, electrical connectors 808, 810, 812, 814, via ribbon cable 611. Each ribbon cable 611 includes first ribbon connector 608 electrically attached to male pins 826 of each second portion 816*a*, 818*a*, 820*a*, 822*a*, and a second ribbon connector 612 that is electrically connected to electrical connectors provided on each hashboard 402. The electrical connectors 808, 810, 812, 814 are spaced sufficiently apart from each other to permit operators to easily sway and maneuver each ribbon connector 608 in position by hand securing each ribbon connector 608 securely to each electrical connector 808, 810, 812, and 814. Once the a plurality of hashboards 402 are securely attached to adapter board 800, the adapter board 800 is securely attached to the I/O interface 202 of the UCB 200 where the male pins of each interface connector 224, 226, 228, 230 are securely inserted within corresponding female ports 824 of electrical connectors 808, 810, 812, and 814. As such, adapter board 800 allows operators to simultaneously electrically connect a plurality of hashboards 402 to the UCB 200 with ease, and speedy efficiency. It is noted that each electrical switch 232, 234, 236, 238 is manually configured to provide a binary value associated with the type and/or model of hashboard 402 connected.

Figure 11:
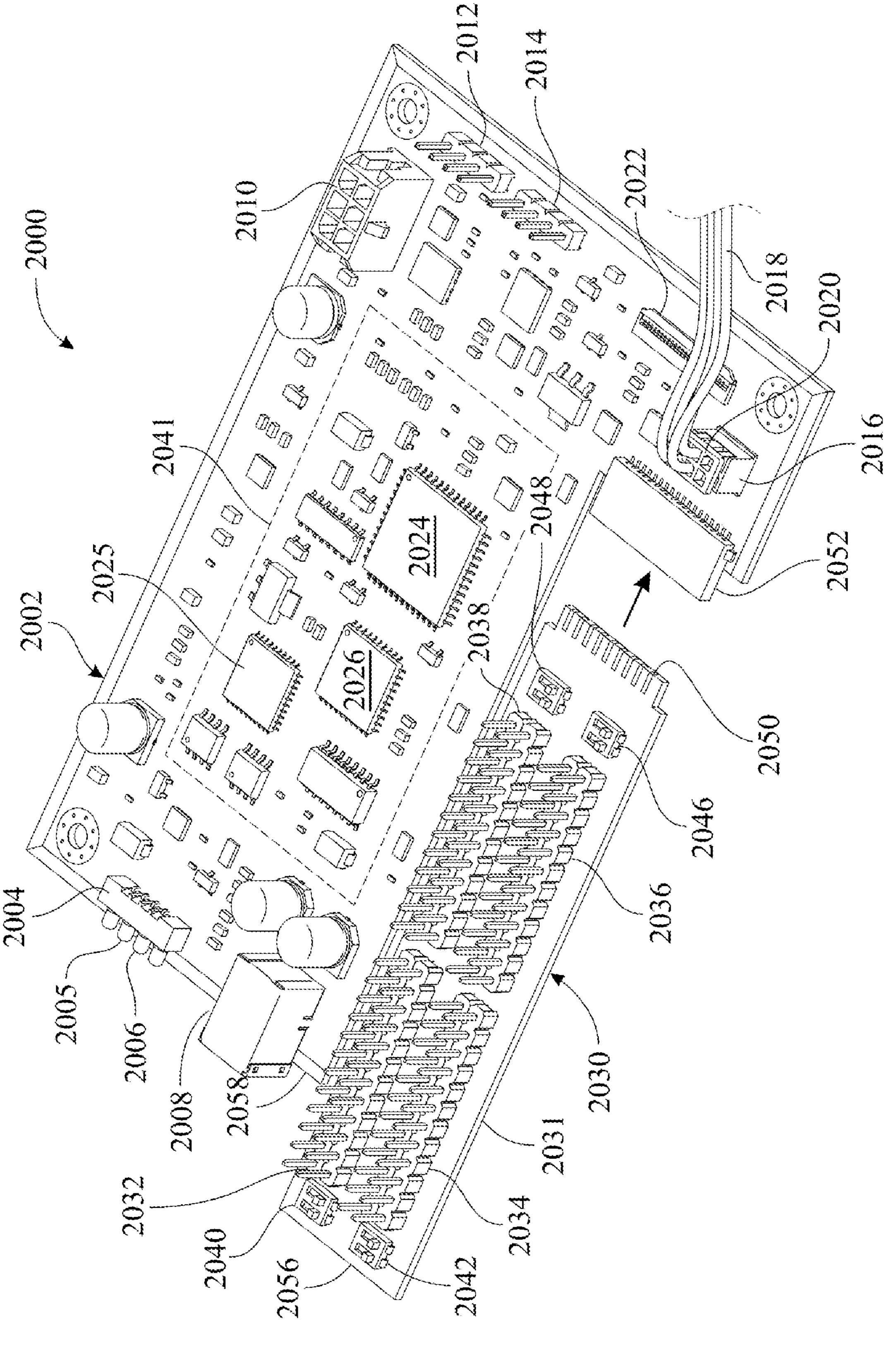
FIG. 11 is a top, perspective view of a universal control board including a system on module SOM board having a system on module circuit, a first input-output interface board having a first board connector, a first plurality of interface connectors for electrically connecting, and communicating with a plurality of hashboards connected thereto, and electrical switches for providing variable data inputs assigned to each connected hashboard for identifying the type and/or model of each connected hashboard, in accordance with one embodiment.

Turning to FIG. 11 there is shown a top, perspective view of a universal control board (UCB) 2000, in accordance with another embodiment of the present invention. UCB 2000 includes a system on module SOM board 2002, and a removable or interchangeable I/O interface board 2030 that allows for quick and easy removal or replacement, or quick and easy replacement of the system on module board 2002. I/O interface board 2030 may be interchanged with other I/O interface boards each having a different number and/or type of electrical connectors to accommodate electrically connecting a smaller or larger number of hashboards, and/or connecting a different plurality of hashboards where each plurality of hashboards comprise different types and/or models of hashboards. Similar to UCB 200, UCB 2000 includes all necessary electronic components for communicating with, and controlling a plurality of hashboards 400 that are electrically mounted on a printed circuit board PCB 2002 defining the system on module board 2002. Such electronic components include, but are not limited to, an indicator status block 2004 including one or more light emitting diodes (LEDs) 2005, 2006 each powered to provide visual indication to operators regarding operating metrics, or status conditions of UCB 2000, IC chips 401, 403, or of electrically attached hashboards. An Ethernet circuit and Ethernet port connector 2008 is also provided to permit remote communication and control of a mining machine 100, over a communication wired or wireless network using for example, a remote desktop or laptop computer, tablet, or smart phone. The Ethernet network circuit and port connector 2008 permits data transfer, downloads and uploads of data or firmware upgrades, monitoring machine metrics such as temperature, power use, voltage and frequency applied to IC chips, communicate with hashboards 400 via, a peripheral interface controller (PIC) 412, if provided on each hashboard, to identify types or models of hashboards connected, control and manage voltage and frequency of each IC mining chips 401, 403, allow the mining machine 100 to access and communicate with any external network, data storage system, data exchange, server, or cloud, calculate profits, determine power usage, or participate in mining pools to name a few. Similar to the Ethernet circuitry in UCB 200, the Ethernet circuitry may include any well-known Ethernet controller IC(s) provided on the universal control board 2000 that consists f memory modules, c s MCU/FPGA.

UCB 2000 further includes a power connector 2010 for receiving DC voltage, such as 12 volts, and up to 300 amps from the PSU 300 via a power cable (not shown) to power the electronic components provided on the UCB 2000. In one example, the power connector 2010 may comprise a Molex™ power connector.

UCB 2000 may include additional features and elements such as an embedded multimedia card, an SD card for installing software, firmware, and for use as storage for other data, information, or programs, and one or more universal bus interfaces (USB) or USB-C for installing software, firmware, for storage, or for debugging issues relating to the UCB 2000. J-TAG, or UART connections may be provided for debugging, and interfacing with the UCB 2000, and additional extension board sockets may also be included.

Fan headers 2012, 2014 are also provided on UCB 2000 for electrically connecting, and controlling cooling fans 104, 106, as shown in FIG. 1. Similar to fan headers 214, 216, each fan header 2012, 2014 is designed to accommodate either a standard two-wire, on/off fan connection system, or alternatively, provide data communication between the UCB 2000 and fans 104, 106 to provided pulse width modulation (PWM) control of the fans. Fan control module 203 provided on the UCB 2000 includes pulse-width modulation circuitry defined by transistors, capacitors, resistors, and designated integrated circuits for controlling the speed of fans 104, 106 to effectively cool IC chips 401, 403 and/or hashboards 400 provided within mining machine 200.

As illustrated in FIG. 11, the system on module board 2002 further includes a power data connector 2016, data cable 2018, and cable connector 2020 to electrically communicate with the power supply unit PSU 300, and with the PIC 412 provided on each hashboard 400, 402, 404, 414 and to instruct the PSU 300 to generate and deliver voltage, at a predetermined value, to each hashboard 400, via, a bus bar arrangement (not shown).

Similar to SOM circuit 241, there is provided a SOM circuit 2041 also represented graphically within dotted lines. SOM circuit 2041 includes, inter alia, a system on a chip SOC, or system on crystal 2024 including one or more FPGA chips, internal controller, one or more processors, one or more DDR memory chips 2026, and one or more NAND memory chips 2025, and DC-DC converters. SOM circuit 2041 integrates a core ARM® Cortex™-A9 based processing system (PS) and 28 nm Xilinx programmable logic (PL aka FPGA) in a single device. The ARM Cortex-A9 CPUs are the heart of the PS and also include on-chip memory, external memory interfaces, and a rich set of peripheral connectivity interfaces. SOM circuit 2041 is an ideal system of choice for performing a hosts of different tasks. One or more programmable FPGA chips and circuitry provides system flexibility for mapping general-purpose (GPIO) pins while employing bi-directional serial communication I2C bus to communicate with (write/read data) the EEPROM or PIC provided on each connected hashboard 400. A universal asynchronous receiver/transmitter (UART) chip and circuitry is also employed to electrically communicate with IC chips 401, 403 on the hashboards. Alternatively, a special peripheral interface (SPI) can also be implemented to communicate with IC chips 401, 403 provided on electrically connected hashboards as well. It is appreciated that other integrated chips may be employed in the SOM circuit 2041 including for example, Xilinx Zynq7000 SOM with FPGA, Allwinner A40i-H, and STM32MP1 series, one or more MCU chips including processor unit, memory modules, communication interfaces, and any peripherals, and memory protection unit MPU chips. Alternatively, specifically designed non-standard interfaces used with FPGA technology can also be engineered to communicate with EEPROM, PIC, or with the IC chips. In one example, SOM circuit 2041 may include an ARM CPU with FPGA using DDR memory and NAND memory where DDR memory can be accessed by both a central processing unit and FPGA. In another embodiment, the SOM circuit 2041 may employ an ARM core CPU with a memory management unit, I/O interfaces, and DDR, and NAND memory. The memory management unit is a special contoller used for running Linux. The one or more processors may comprise a central processing unit, a microprocessor, or a microcontroller.

With continued reference to FIG. 11, the removable, interchangeable I/O interface board 2030 includes a plurality of interface connectors 2032, 2034, 2036, 2038 mounted on printed circuit board 2031 for electrically connecting a plurality of hashboards. As shown in the exemplary embodiment, the interchangeable I/O interface board 2030 includes a total of four (4) interface connectors 2032, 2034, 2036, 2038 that are arranged in a two-by-two parallel configuration to accommodate electrically connecting a plurality of hashboards thereto. In one embodiment, each interface connector 2032, 2034, 2036, 2038 comprises 24 (122) male pins. It is appreciated that any number of interface connectors may be employed, and oriented on the PCB 2031 in any arrangement, or configuration. Further, each interface connector 2032, 2034, 2036, and 2038 may comprise any number of electrically connecting male pins, or female ports, sockets, plug-in connectors, or board-to-board connectors.

In one optional embodiment, there are provided electrical switches comprising dual in-line package (DIP) switches, denoted at 2040, 2042, 2042, and 2044. DIP switches 2040, 2042, 2042, 2044 are configured to provide variable data inputs for assigning hashboard identifiers to each electrically connected hashboard in order to retrieve, and implement the correct application firmware, software, and/or drivers needed to communicate with, and control each of the electrically connected plurality of hashboards when electrically connected to I/O interface board 2030 of UCB 2000. In one example, each DIP switch 2040, 2042, 2042, 2044 comprises a double-toggle DIP switch for providing variable data inputs comprising binary values of 00, 01, 10, and 11.

It is appreciated that DIP switches 2040, 2042, 2042, 2044 may be eliminated, and the method for determining or identifying each electrically connected hashboard is accomplished by a visual, manual process. For example, written or graphical information, data, or indicia such as, but not limited to, a bin number, model number, serial number, batch number, name of manufacturer, a brand name, or other object identifier may be physically disposed on each hashboard 400, or on each cryptocurrency miner where users can visually inspect each connected hashboard, or each cryptocurrency miner, and subsequently, manually enter the written indicia associated with the hashboards and/or cryptocurrency miners into memory of the universal control board 200, 2000 via, an interface, where the one or more processors communicate with memory to process the entered indicia in order to retrieve and implement the correct firmware or software program needed to communicate with, and control the electrically connected hashboards.

Interface board 2030 further includes a first board connector 2050 having a plurality of conductive copper or conductive ink traces adapted for engaging electrical contacts provided within a plug-in or socket connector 2052 that is provided on the system on module board 2002. As illustrated in FIG. 11, the first board connector 2050 is physically inserted within the plug-in, or socket connector 2052 in the general direction of the arrow forcing the first board connector 2050 to electrically engage with the electrical contacts provided within the plug-in or socket connector 2052 allowing the end 2056 of PCB 2031 to align coplanar with the side edge 2058 of the main PCB 2002 forming a generally square or rectangular shaped UCB 2000.

Figure 12:
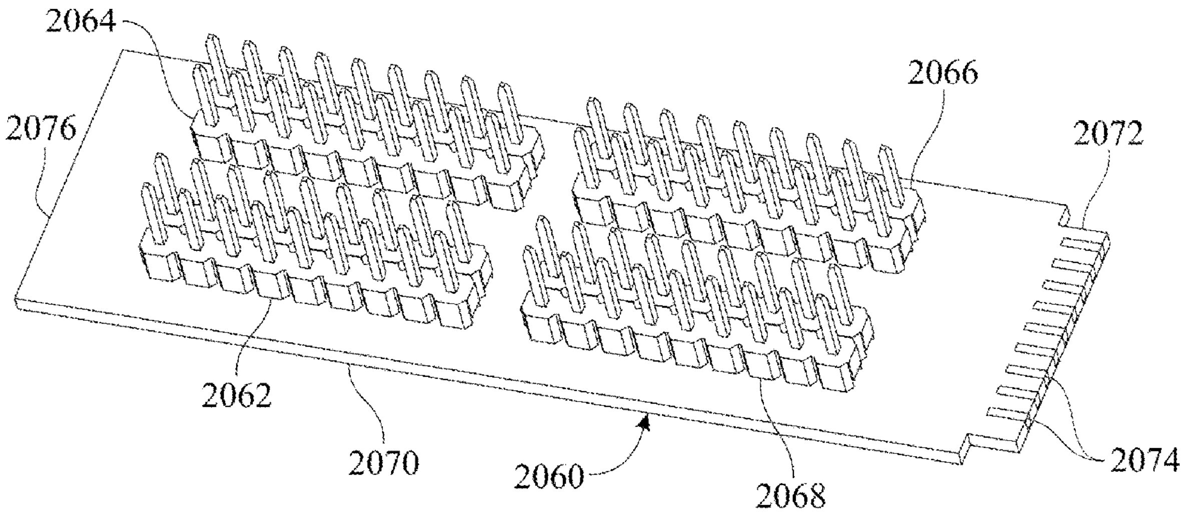
FIG. 12 is a perspective view of an interchangeable interface board including a second plurality of interface connectors each including a predetermined number of male pins different in number then male pins provided on the first plurality of interface connectors.

With reference now made to FIG. 12, there is shown an interchangeable I/O interface board 2060, in accordance with one alternative embodiment. The interface board 2060 includes a plurality of interface connectors 2062, 2064, 2066, 2068 that are each mounted onto a printed circuit board 2070 to accommodate electrically connecting a plurality of hashboards. As shown in the exemplary embodiment, a plurality of interface connectors 2062, 2064, 2066, 2068 are arranged in a two-by-two parallel configuration on printed circuit board 2070. Each of the plurality of interface connectors 2062, 2064, 2066, 2068 comprises 18 (92) male pins, which is different in number than male pins provided on I/O interface board 2030, as shown in FIG. 11. It is appreciated that any number of interface connectors may be employed, and oriented on the printed circuit board 2070 in any arrangement, or configuration. Further, each of the plurality of interface connectors 2062, 2064, 2066, 2068 may comprise any number of electrical connectors including any of male pins, female ports, sockets, plug-in connectors, or board-to-board connectors. It is noted that I/O interface board 2060 is also void of any DIP switch as provided on I/O board 2030 in FIG. 11. I/O interface board 2060 also includes a board connector 2072 having a plurality of conductive copper or conductive ink traces 2074 for engaging electrical contacts provided within a plug-in or socket connector 2052, as illustrated in FIG. 11. Board connector 2072 is physically inserted within the plug-in, or socket connector 2052 in the general direction of the arrow forcing the conductive copper traces 2074 of the board connector 2072 to electrically engage electrical contacts provided within the plug-in or socket connector 2052 allowing the side edge 2076 of PCB 2070 to align coplanar with the side edge 2058 of the main PCB 2002 resulting in a generally square or rectangular shaped UCB 2000. It is appreciated that the I/O interface board 2060 is preferably employed when the hashboard identification software process, via the system on module circuit 2041 is implemented to automatically determine the type and/or model of hashboard electrically connected to each of the plurality of interface connectors 2062, 2064, 2066, and 2068.

Figure 13:
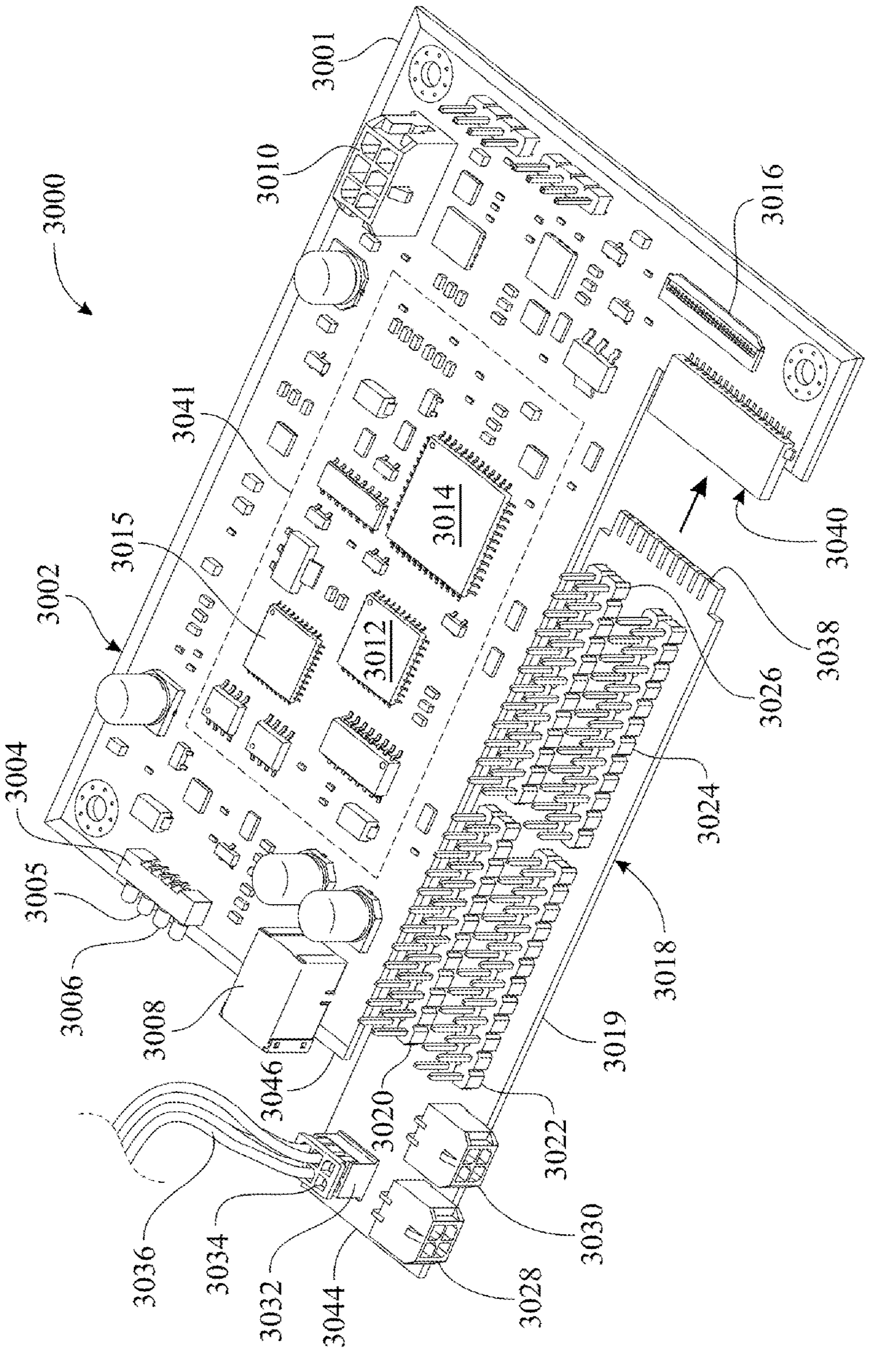
FIG. 13 is a top, perspective view of a universal control board including a system on module SOM board having a system on module circuit, a second input-output interface board having a second board connector, another plurality of interface connectors, fan headers, and a data connector coupled to a cable for electrically connecting, managing, and communicating with, a plurality of hashboards, cooling fans, and a power supply unit.

In FIG. 13, there is shown a top, perspective view of a universal control board (UCB) 3000, in accordance with an alternative embodiment of the present invention. UCB 3000 comprises a system on module board 3002, and a removable, interchangeable I/O interface board 3018. UCB 3000 is similar to both UCB 200, and UCB 2000, with the exception that the removable, interchangeable I/O interface board 3018 includes fan headers 3028, 3030 for accommodating electrically connecting cooling fans 104, 106 shown in FIG. 1, a power data connector 3032 for receiving a cable connector 3034 coupled to a data cable 3036 for electrically communicating with the power supply unit PSU 300, and an optional peripheral interface controller (not shown). The system on module SOM circuit 3041 is graphically depicted within dotted lines on the system on module board 3002. With similar advantages, operators can quickly and easily remove I/O interface board 3018, and replace it, or interchange it with another I/O interface board for electrically connecting different pluralities of hashboards to UCB 3000. The removable, I/O interface board 3018 allows users to quickly remove the system on module board 3002 making it easier to quickly interchange, replace or repair the system on module board 3002 without the need for disconnecting fans, power cable, or the electrically connected hashboards. The I/O interface board 3018 may include a plurality of different, interchangeable I/O interface boards, each having a different number and/or type of interface connectors for accommodating electrically connecting a smaller or larger number of a plurality of hashboards, and/or different pluralities of hashboards. Also, the I/O interface board 3018 may include a different number, and/or different types of fan headers 3028, 3030, or power data connectors 3032. UCB 3000 includes all the necessary electronic components for communicating with, and controlling a plurality of hashboards 400, 402, 404, 414 that are generally housed within the enclosure of the cryptocurrency mining machine 100.

UCB 3000 includes electronic components electrically mounted on a printed circuit board (PCB) 3001 defining the system on module board 3002. Such electronic components includes, but is not limited to, an indicator status block 3004 including (LEDs) 3005, 3006, an Ethernet port connector 3008 associated with Ethernet network circuitry, a power connector 3010 for supplying power to the electronic components, a system on module circuit 3014, and an display interface connector 3016 for connecting a visual display such as an LCD monitor. Similar to SOM circuit 2041, SOM circuit 3041 includes, inter alia, one or more processors, microprocessors, or central processing units, one or more FPGA chips 3014, memory including one or more DDR memory chips 3012, one or more NAND memory chips 3015, and DC-DC converters. The one or more FPGA chips and FPGA circuitry provides system flexibility for mapping general-purpose (GPIO) pins provided on the interface board 3018 while employing bi-directional serial communication I2C bus to communicate with (write/read data) an EPROM, EEPROM or PIC that may be provided on each of the electrically connected hashboards 400. It is appreciated that the memory, one or more processors, and FPGA chips may be provided on a single, system on chip or system on crystal arrangement. A universal asynchronous receiver/transmitter (UART) chip and supporting circuitry is also employed to electrically communicate with IC chips 401, 403 provided on the hashboards. Alternatively, a special peripheral interface (SPI) can also be implemented to communicate with IC chips 401, 403 provided on electrically connected hashboards as well. It is appreciated that other integrated chips may be provided in the SOM circuit 3041 including for example, Xilinx Zynq 7000 SOM with FPGA, Allwinner A40i-H, STM32MP1 series, one or more MCU chips including processor unit, memory modules, communication interfaces, and any peripherals, and memory protection unit MPU chips. Alternatively, specifically designed non-standard interfaces used with FPGA technology can also be engineered to communicate with EEPROM, PIC, or with the IC chips. SOM circuit 3041 also includes the necessary electronic circuit components and configuration to communicate with, manage, and control the fan headers 3028, 3030, and data connector configuration 3032, 3034, and 3036.

Removable I/O interface board 3018 includes a printed circuit board 3019 having a plurality of interface connectors 3020, 3022, 3024, 3026 mounted thereon for electrically connecting a plurality of hashboards comprising for example a first plurality of hashboards 400, or a second plurality of hashboards 402, or a third plurality of hashboards 404, or a fourth plurality of hashboards 414. As shown in the exemplary embodiment, there is provided a total of four (4) interface connectors 3020, 3022, 3024, 3026 oriented in a two-by-two parallel configuration. In one embodiment, each interface connector 3020, 3022, 3024, 3026 comprises a plurality of electrical connectors comprising 24 male pins (12×2). It is appreciated that any number of interface connectors may be employed, and oriented in any arrangement, or configuration on PCB 3019. Further, each interface connector 3020, 3022, 3024, 3026 may comprise any number of electrically connecting male or female pins, sockets, board-to-board connectors, or plug-in connectors.

The removable, interchangeable I/O interface board 3018 includes a board connector 3038 having electrical power traces for electrically engaging electrical contacts provided within a plug-in or socket connector 3040 provided on PCB 3001. As illustrated by the directional arrow illustrated in FIG. 13, I/O interface board 3018 is electrically attached to the SOM board 3002 by inserting board connector 3038 securely within socket connector 3040 such that electrical traces defining board connector 3038 electrically engage metal contacts provided within socket connector 3040 where upon fully inserting the board connector 3038 within the plug-in connector 3002 the end 3044 of PCB 3019 aligns coplanar with a side edge 3046 of the SOM board 3002 resulting in a generally square or rectangular shaped UCB 3000. It is appreciated that electrical traces provided on board connector 3038 are electrically coupled to functionally accommodate the operation of fan headers 3028, 3030, and the power data connector 3032.

Figure 14:
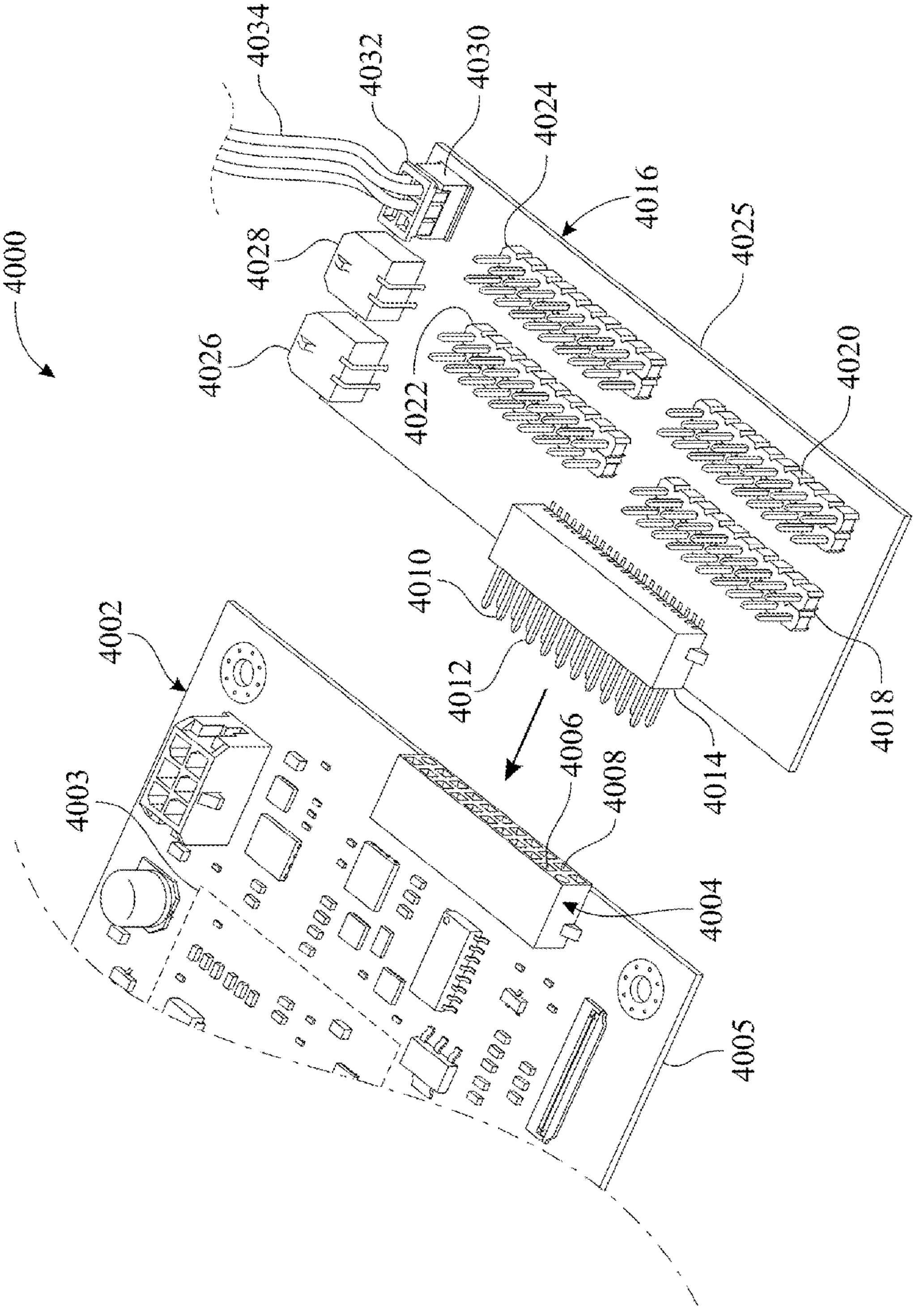
FIG. 14 is a partial, top, perspective view of a universal control board and input-output interface board similar to the universal control board of FIG. 13, with the exception of having a third board connector that is different than the second board connector of FIG. 13, and a third plurality of interface connectors having a different number of male pins for electrically connecting, managing, and communicating with, a plurality of hashboards having a different pin layout or connection configuration.

There is shown in FIG. 14, an alternative embodiment of a universal control board (UCB) 4000, in accordance with an alternative embodiment. UCB 4000 includes a system on module board 4002 having a system on module circuit 4003 that is functionally similar in operation to that of SOM board 3002, and system on module circuit 3041. Although a partial view of UCB 4000 is illustrated, it is noted that UCB 4000 includes all the same electronic components identical in operation and functionality to the electronic components provided on UCB 3000 in FIG. 13, with the exception of a different board connector configuration. The system on module board 4002 includes a female socket connector 4004, and male board connector 4014 each respectively mounted, and electrically configured along an edge of a main printed circuit board PCB 4005, and the removable I/O interface board 4016. In one non-limiting embodiment, female socket connector 4004 includes any number of female ports 4006, 4008 generally adapted to receive, in electrical continuity, a number of male pins 4010, 4012 that extend from male board connector 4014. It is noted that the interface board 4016 may optionally include a peripheral interface controller to communicate with the system on module circuit 4003.

Removable I/O interface board 4016 includes a plurality of interface connectors 4018, 4020, 4022, 4024 provided on PCB 4025, and arranged in a two-by-two parallel configuration for electrically connecting a plurality of hashboards 402. In one embodiment, each interface connector 4018, 4020, 4022, 4024 comprises 20 male pins (10×2) for engaging 20 female ports (10×2) of a ribbon connector 608 associated with a ribbon cable 611 coupled to a hashboard 402, as better illustrated in FIG. 3B. It is appreciated that any number of interface connectors may be employed, and oriented in any arrangement, or configuration on the printed circuit board 4025, and each interface connector 4018, 4020, 4022, 4024 may comprise any number of electrically connecting male pins, female ports, male or female sockets, board-to-board connectors, or plug-ins. For example, in one embodiment, each interface connector 4018, 4020, 4022, 4024 may comprise 24 (12×2) male pins to accommodate receiving an adapter 500, 600, 700, or an adapter board 800, 900, and 1000. In one alternative embodiment, each interface connector 4018, 4020, 4022, 4024 may comprise 18 (9×2) male pins to accommodate receiving a ribbon connector having 18 female ports, where the ribbon connector is associated with a ribbon cable electrically connected to a hashboard that comprises an 18 pin attachment configuration. Also, the female plug-in or socket connector 4004, and male board connector 4014 may be interchanged.

The I/O interface board 4016 further includes fan headers 4026, 4028 mounted on the PCB 4025 in a manner that affords convenient, unrestricted access when electrically connecting electrical connectors associated with cooling fans 104, 106 thereto. Similar to removable I/O interface board 3018 of FIG. 13, removable I/O interface board 4016 further includes a power data connector 4030 for receiving a cable connector 4032 coupled to a data cable 4034 to electrically communicate with the PSU 300 to power electrically connected hashboards to interface board 4016.

It is appreciated that one or more processors, field programmable gate array chips (FPGA's), EPROMs, EEPROMs, or peripheral interface controller (PIC) controllers 3031, 4031 may be provided on any of the hashboards 400, 402, 404, 414, and/or on the removable I/O interface boards 2030, 2060, 3018, 4016 to allow SOM circuits 241, 2041, 3041, 4003, of each respective UCB 2000, 3000, 4000 to electrically communicate with each hashboard that is electrically connected to respective I/O boards 2030, 3018, and 4016.

Figure 15:
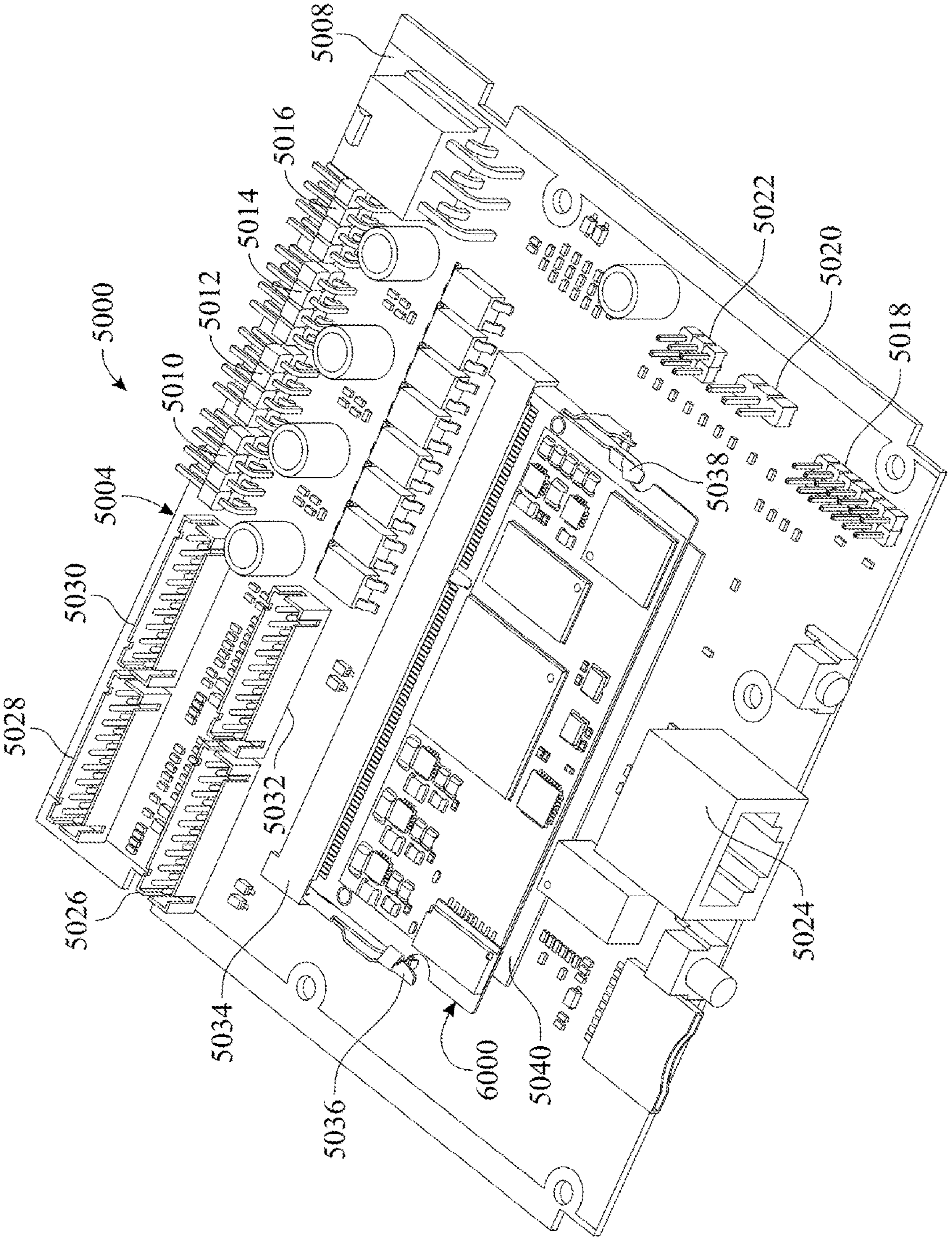
FIG. 15 is a top, perspective view of a universal control board including a universal system on module (USOM) board that is removably, electrically connected to an interchangeable, interface board, via, an electrical board connector, where the interchangeable interface board includes a first plurality of electrical hashboard connectors, fan headers, a power circuit, and an Ethernet circuit with Ethernet port, in accordance with an embodiment of the present invention.
Figure 16:
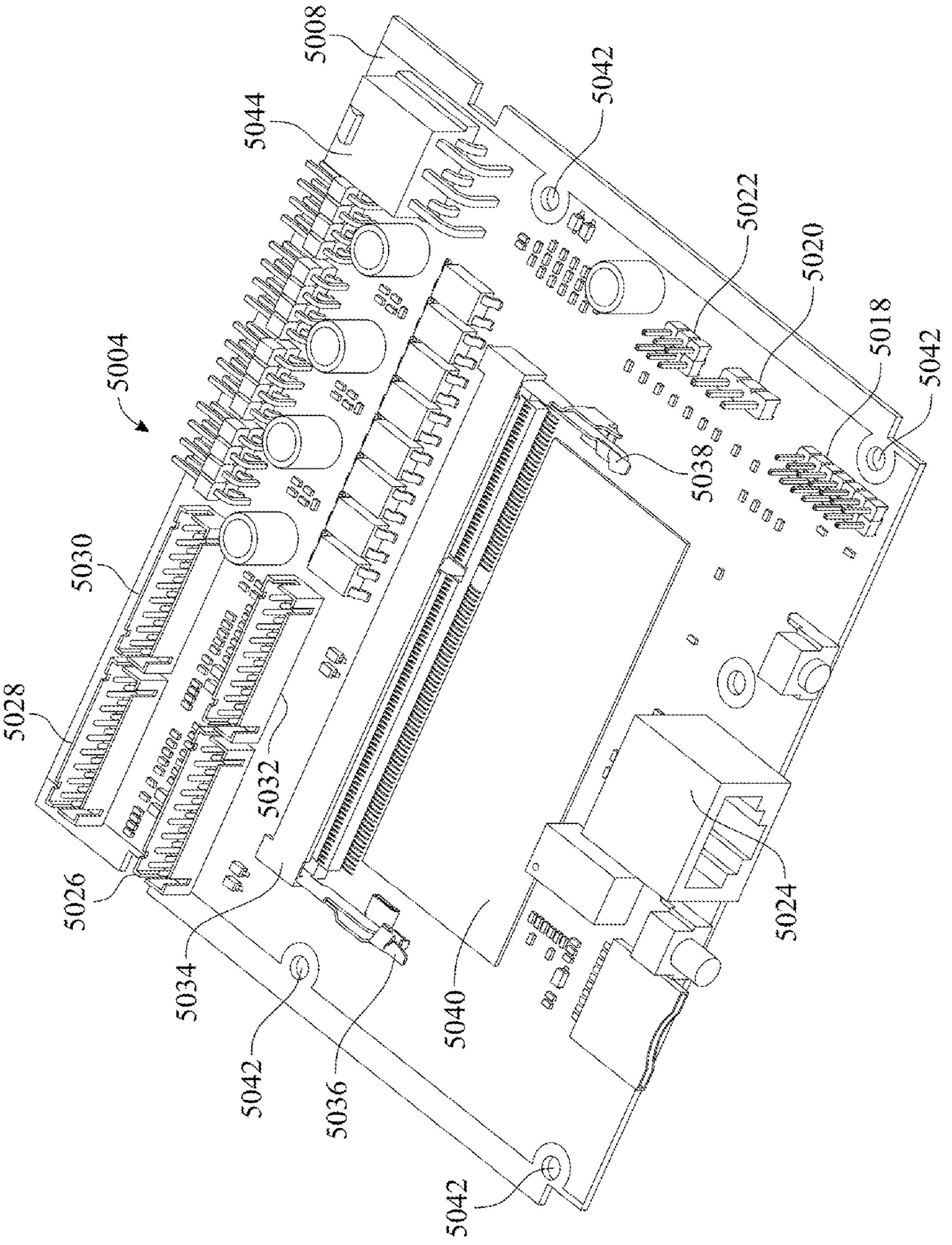
FIG. 16 is a top, perspective view of the interchangeable interface board of FIG. 15, showing the universal system on module board removed to expose the electrical board connector.
Figure 17:
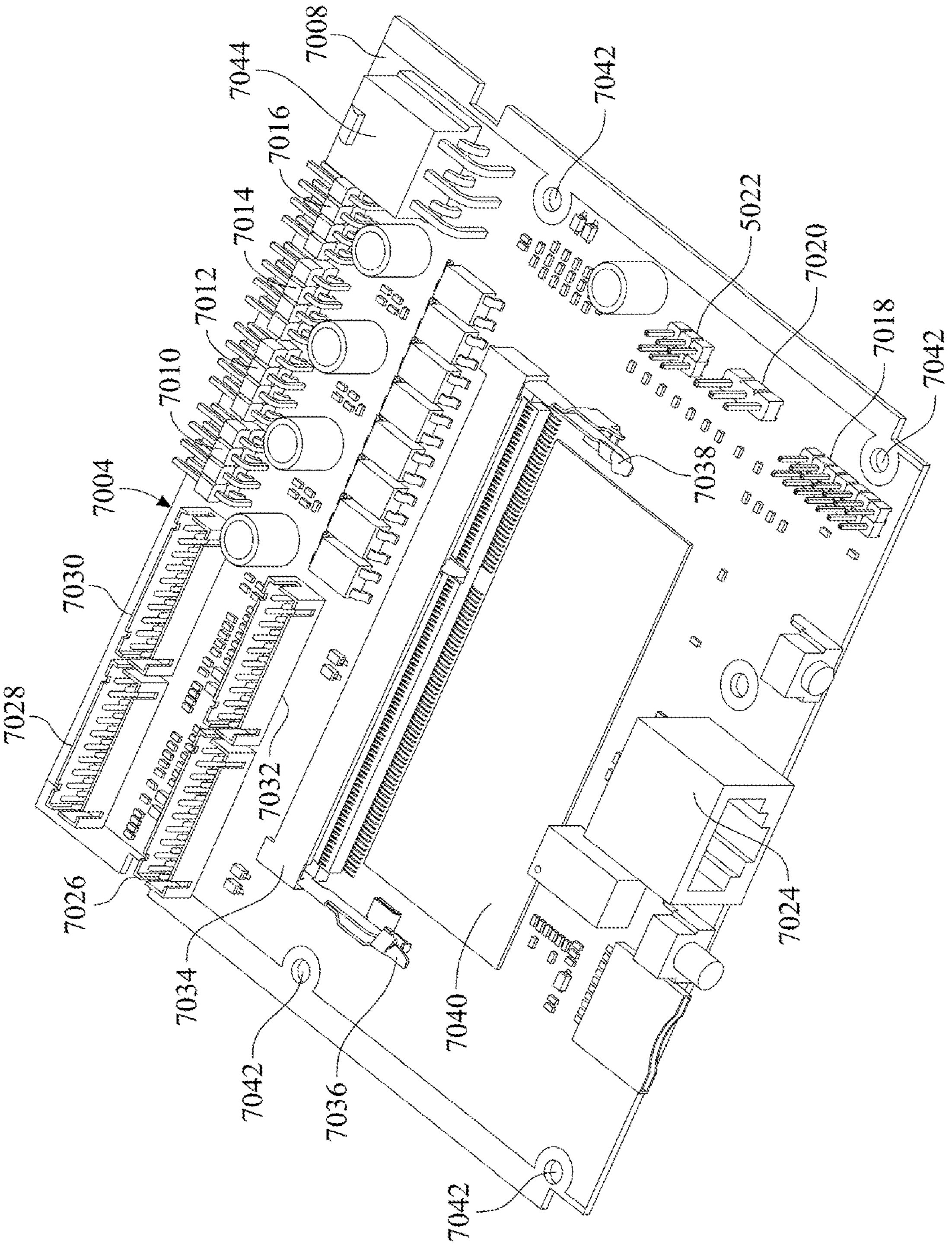
FIG. 17 is a top, perspective view of an interchangeable interface board similar to the interchangeable interface board of FIG. 16, with the exception of a second plurality of electrical hashboard connectors each having a different number of interface pins, in accordance with another embodiment.

Turning now to FIGS. 15, and 16 there are shown a top, perspective view of a universal control board (UCB) 5000, and a top, perspective view of interchangeable I/O interface board 5004, respectively, in accordance with an alternative embodiment of the present invention. UCB 5000 comprises interchangeable I/O interface board 5004, and a universal system on module (USOM) board denoted at 6000. It is appreciated that UCB 5000 provides a host of benefits for use in the cryptocurrency mining industry. For example, USOM board 6000 is operatively used with different, interchangeable I/O interface boards 5004, 7004, as illustrated in FIGS. 16 and 17, respectively, to accommodate communicating with and controlling different pluralities of hashboards. When design changes are made to existing hashboards, or when newly designed hashboards are produced, various changes are also made to control boards to functionally accommodate the newly designed hashboards. The present invention addresses the problem of having to redesign control boards by providing a universal control board 5000. UCB 5000 includes a USOM board 6000 for use with a host of interchangeable I/O interface boards 5004, 7004 thereby eliminating the need for re-engineering control processing systems every time a newly designed hashboard is introduced. Manufacturing costs for producing interchangeable I/O interface boards 5004, 7004 are effectively lower than having to re-engineer and manufacture USOM boards 6000 for each new I/O interface board. Thus, providing a USOM board 6000, and changing only the interchangeable I/O interface boards 5004, 7004 to accommodate different pluralities of hashboards, allows users to reduce costs and labor, and eliminates the need for redesigning computing processing systems. Further, maintenance and upkeep play a vital role in maintaining the effective and efficient operation of miners for retaining sustainable profits. As such, either the USOM board 6000, or the interchangeable I/O interface boards 5004, 7004 can be easily and quickly, replaced, interchanged, or repaired if damaged or deemed defective without having to incur significant down time when mining digital currency.

As illustrated in FIGS. 15, 16, and 17, each interchangeable I/O interface board 5004, 7004 comprises a host of electronic components that are operatively mounted on an upper surface of a printed circuit board 5008, and 7008, respectively. Various electronic components include fan headers 5010, 5012, 5014, 5016, 7010, 7012, 7014, 7016, one or more universal bus interfaces (USB) or USB-C adapted for installing software, firmware, for storage, or for debugging issues, and/or a 14-pin JTAG connector 5018, 7018, a 3-pin UART connector 5020, 7020, and a 6-pin I2C interface connector 5022, 7022 to manage data control, manage power supply, or also for installing software, firmware, for storage, or for debugging issues. It is appreciated that the I/O interface board 5004, 7004 may also include an embedded multimedia card, or SD card system configuration for installing software, firmware, and for use as storage for other data, information, or programs.

Each interchangeable I/O interface board 5004, 7004 further includes electrical hashboard connectors 5026, 5028, 5030, 5032, and 7026, 7028, 7030, 7032, respectively, that are each adapted for electrically connecting different pluralities of hashboards. In one non-limiting embodiment, each electrical hashboard connector 5026, 5028, 530, 5032, 7026, 7028, 7030, 7032 comprises a socket connector that includes a predetermined number of male pins. For example, in one non-limiting embodiment, each electrical hashboard connector 5026, 5028, 530, 5032 comprises a total of 18 (9×2) male pins, whereas each electrical hashboard connector 7026, 7028, 7030, 7032 comprises a total of 20 (10×2) male pins. Thus, as illustrated, interchangeable I/O interface board 7004 is similar in functionality, operation, and configuration as interchangeable I/O board 5004, with the exception of electrical hashboard connectors 7026, 7028, 7030, 7032 having a different number of male pins to accommodate hashboards that include ribbon connectors having a different number of electrical connections. It is appreciated that a host of different interchangeable I/O interface boards may include different electrical hashboard connectors comprising socket connectors having a different number of male pins to accommodate use with different types and/or models of hashboards. For example, one I/O interface board may include socket connectors that comprise 14 male pins, and another I/O interface board may include socket connectors that comprise 16 male pins, or 18 male pin, or 20 male pins, or 22 male pins, or 24 male pins. It is also appreciated that electrical hashboard connectors 5026, 5028, 530, 5032, 7026, 7028, 7030, 7032 may comprise socket connectors having female ports to accommodate insertion of male pins as one alternative.

Figure 18:
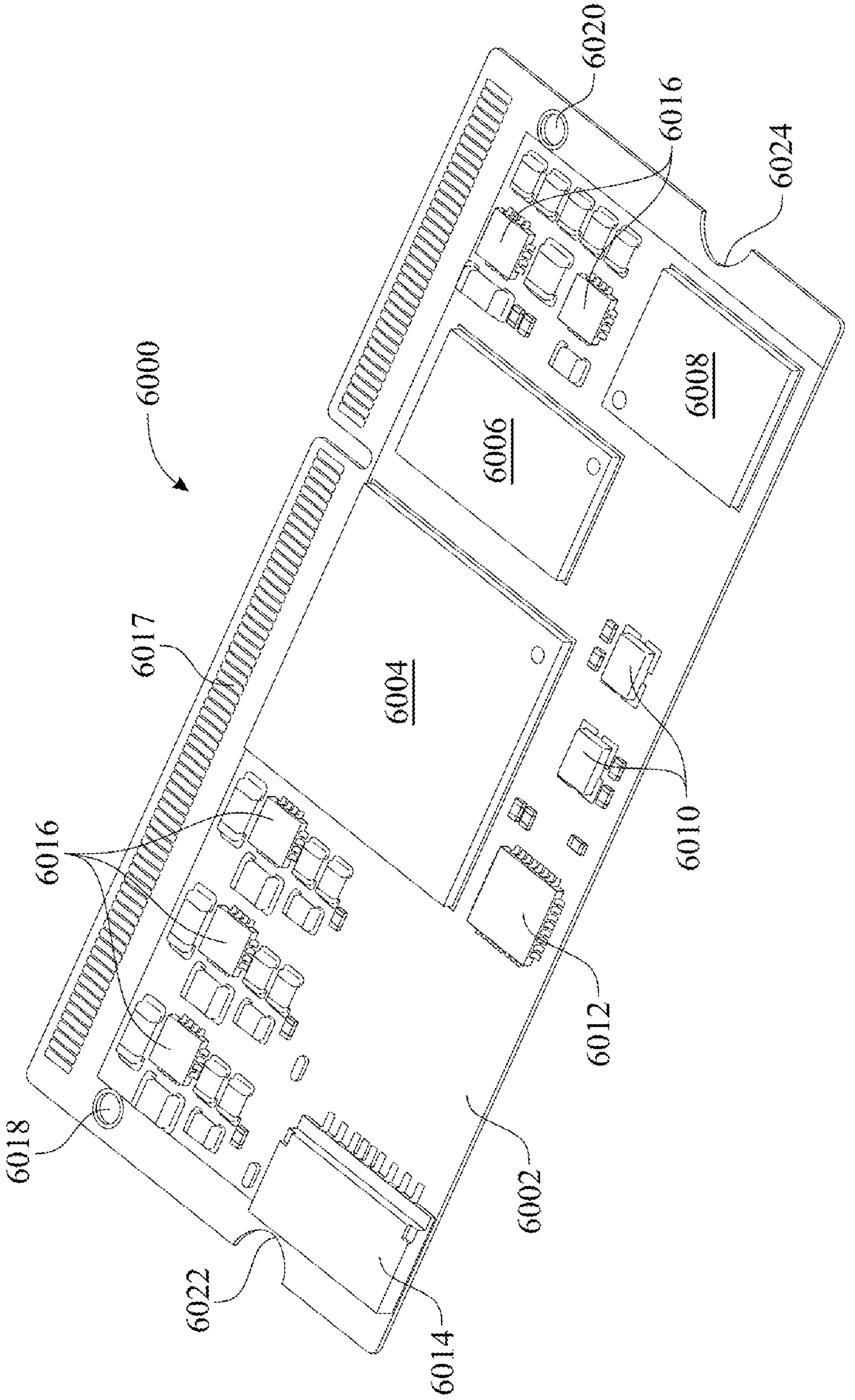
FIG. 18 is a top, perspective view of the universal system on module board including one or more processors, memory, memory interface, one or more DDR memory chips, one or more NAND memory chips, and electrical board contacts for removeably, electrically engaging with the electrical board connector of the interchangeable, interface board.

Each interchangeable I/O interface board 5004, 7004 further includes an electrical interface connector or electrical board connector 5034, 7034 that may be supported by accelerate graphics, PCI-X, or PCI express protocols. In one embodiment, the electrical board connector may include any of a peripheral component interconnect (PCI-X), a peripheral component interconnect express connector (PCI Express), a mini-peripheral component interconnect connector (mini Pele), a PLS connector having different pitch (1.0, 1.27, 2.0, 2.54) and different number of pins, FPC connector with flat-flex cable, a rigid-flex printed circuit board, a zebra-stripe connector, or a sodimm connector. In one embodiment, USOM board 6000 may be directly soldered to solder contacts that are provided on interface board 5004, and 7004. The electrical board connector 5034, 7034 is provided in a general central region of the PCB 5008, 7008, respectively. The electrical board connector is adapted to electrically receive the USOM board 6000 securely therein. As shown, electrical board connector 5034, 7034 includes two holding arm extensions 5036, 5038, and 7036, 7038, respectively, for engaging indents 6022, 6024 that are formed on opposite sides of the USOM board 6000, as shown in FIG. 18 for securing the USOM board 6000 firmly in place within the PCI slot connector 5034, and 7034. Electrical board contacts 6017 are designed to electrically engage electrical contacts provided in the electrical board connector 5034, 7034. It is appreciated that interchangeable I/O interface boards can include any number of electrical board connectors to accommodate use with any number of USOM 6000 boards, or other specifically designed daughter boards.

As illustrated in FIGS. 16, and 17 interface board 5004, 7004 includes a cut-out region, or a generally, square or rectangular opening 5040, 7040 that is formed within or completely through the printed circuit board 5008, and 7008. The square or rectangular opening 5040, 7040 provides several advantages. First, is allows for easy, and unobstructed attachment of the USOM board 6000 to the electrical board connector 5034, 7034 of respective interface boards 5004, 7004 without interfering with any electronics, second, it allows for adding additional electronic components via, a secondary system on module board having additional memory chips, FPGA chips, and other electronics that can be disposed in parallel with the SOM board 6000, third, it reduces the weight of the interface boards 5004, 7004, and finally, it promotes air circulation and cooling of the USOM board 6000. As shown, the generally, square or rectangular opening 5040, 7040 is situated under, and parallel with, the USOM board 6000 when electrically coupled to the electrical board connector 5034, and 7034. Also, two or more mounting holes 5042, 7042 are formed through PCB 5008, 7008 for securely mounting interchangeable I/O interface boards 5004, 7004 within a miner. For example, mounting posts may be employed for securing the boards 5004, 7004 in place via, fasteners. It is appreciated that interchangeable I/O interface boards 5004, 7004 may each comprise any geometric shape, size, and dimension as well.

Each interchangeable I/O interface board 5004, 7004 includes an Ethernet network interface circuit having an Ethernet port connector 5024, 7024 for remotely communicating with the mining machine 100 over a wired or wireless communication network, via, a remote device such as desktop or laptop computer, tablet, or smartphone. The network interface circuitry allows users to electrically communicate with each miner 100 to transfer, download, and upload data, drivers, and/or firmware upgrades, to remotely monitor machine operating metrics such as temperature, power use, voltage and frequency applied to IC chips 401, 403, communicate with, manage and control the electrically connected hashboards, to identify types of hashboards connected, to control and manage voltage and frequency of each IC mining chips 401, 403, and allow the mining machine 100 to access and communicate with each other, or any external network, data storage system, data exchange, server, or cloud, to also calculate profits, determine power usage, or participate in mining pools, to name a few. The network circuit may include any well-known Ethernet IC controller comprising a processor unit, memory modules, communication interfaces, and peripherals such as an MCU/FPGA. Examples of Ethernet IC chips may include the ENC28J60/SP, WS100, or W5500, manufactured by Microchip™, and WizNet™. Each Ethernet port connector 5024, 7024 may comprise an RJ-45 connector. In another embodiment, UCB 5000, UCB 7000 may each include wireless technology to communicate with various remote devices, external servers or databases, or with a cloud management system. The wireless technology may include transmitters, transceivers, receivers, transponders, or any combination thereof to effectuate operating over a wireless network such as 4G, 5G, ZigBee, or Bluetooth. There is also provided a power circuit including a power supply port 5044, 7044 for receiving power from a power supply.

The universal system on module (USOM) board 6000, as illustrated in FIG. 18, includes a system on module SOM circuit that comprises various electronic components that are electrically configured and mounted on the surface of a printed circuit board PCB 6002. The system on module circuit includes, inter alia, a system on a crystal, or a system on a chip SOC 6004 including one or more FPGA chips, ARM cores, and an internal controller or one or more processors to function with one or more DDR memory chips 6006, one or more NAND memory chips 6008 for storing firmware, and an Ethernet interface circuit and Ethernet chip 6012. In one embodiment, the USOM 6000 integrates a core ARM® Cortex™-A9 based processing system (PS) and 28 nm Xilinx programmable logic (PL aka FPGA) in a single device. The ARM Cortex-A9 CPUs are the heart of the PS and also include on-chip memory, external memory interfaces, and a rich set of peripheral connectivity interfaces. USOM board 6000 is an ideal system of choice for performing a hosts of different tasks. One or more programmable FPGA chips 6004 provides system flexibility for mapping general-purpose input-output (GPIO) contacts or pins while employing bi-directional serial communication I2C bus to communicate with (write/read data) the EEPROM or PIC provided on each connected hashboard 400. A universal asynchronous receiver/transmitter (UART) chip and circuitry is also employed to electrically communicate with IC chips 401, 403 on the hashboards. Alternatively, a special peripheral interface (SPI) can also be implemented to communicate with IC chips 401, 403 provided on electrically connected hashboards as well. It is appreciated that other integrated chips may be employed including for example, Xilinx Zynq7000 SOM with FPGA, Allwinner A40i-H, STM32MP1 series, one or more MCU chips including processor unit, memory modules, communication interfaces, and any peripherals, and memory protection unit MPU chips. Alternatively, specifically designed non-standard interfaces used with FPGA technology can also be engineered to communicate with one or more EEPROM chips, one or more EPROM chips, and peripheral interface connectors PIC provided on hashboards, or with other IC chips. There is also provided an SD connector 6014 for electrically connecting an SD card, and DC-DC converters generally denoted at 6016. In one embodiment an embedded OS (Linux) on arm cores is employed, and communication is done with peripheral hardware either via, hardware interfaces of system on circuit, or via, interfaces implemented with FPGA firmware. Interface wires are routed to sodimm connector and via, a sodimm socket runs to either electrical hashboard connectors, or to intermediate components like an Ethernet transformer or interface converters.

USOM board 6000 further includes electrical board contacts 6017 comprising a series of copper traces that extend along a lateral edge of the PCB 6002 for electrically engaging electrical connectors of the electrical board connector 5034, 7034. There is also provided in one non-limiting embodiment, mounting holes 6018, 6020 for securely mounting and attaching the USOM 6000 to the PCB 5008, 7008 of UCB 5000, UCB 7000, respectively. Other mounting configurations may be employed including posts, clips, plug-ins, or friction holders. Though USOM board 6000 comprises a single printed circuit board, it is appreciated that USOM board 6000 may comprise any number of printed circuit boards, or daughter boards that are separately electrically connected to the UCB 5000, or UCB 7000. For example, electrical board connector 5034, 7034 may comprises any number of PCI connectors where each PCI connector is designed and adapted to electrically receive a daughter board defining the functional operation of the USOM board 6000. I2C bi-directional serial communication bus controller is provided on the FPGA where FPGA pins are in corresponding communication with interface pins provided in socket connectors 5026, 5028, 5030, 5032, 7026, 7028, 7030, 7032 to communicate with one or more EEPROM, or EPROM chips provided on each hashboard 400, 402, 404, and 414. Read/write data instructions are transmitted to the EEPROM or EPROM chips via, the I2C bus controller to perform various operations. It is appreciated that the USOM board 6000 may comprise any shape, size, and dimension.

Figure 19:
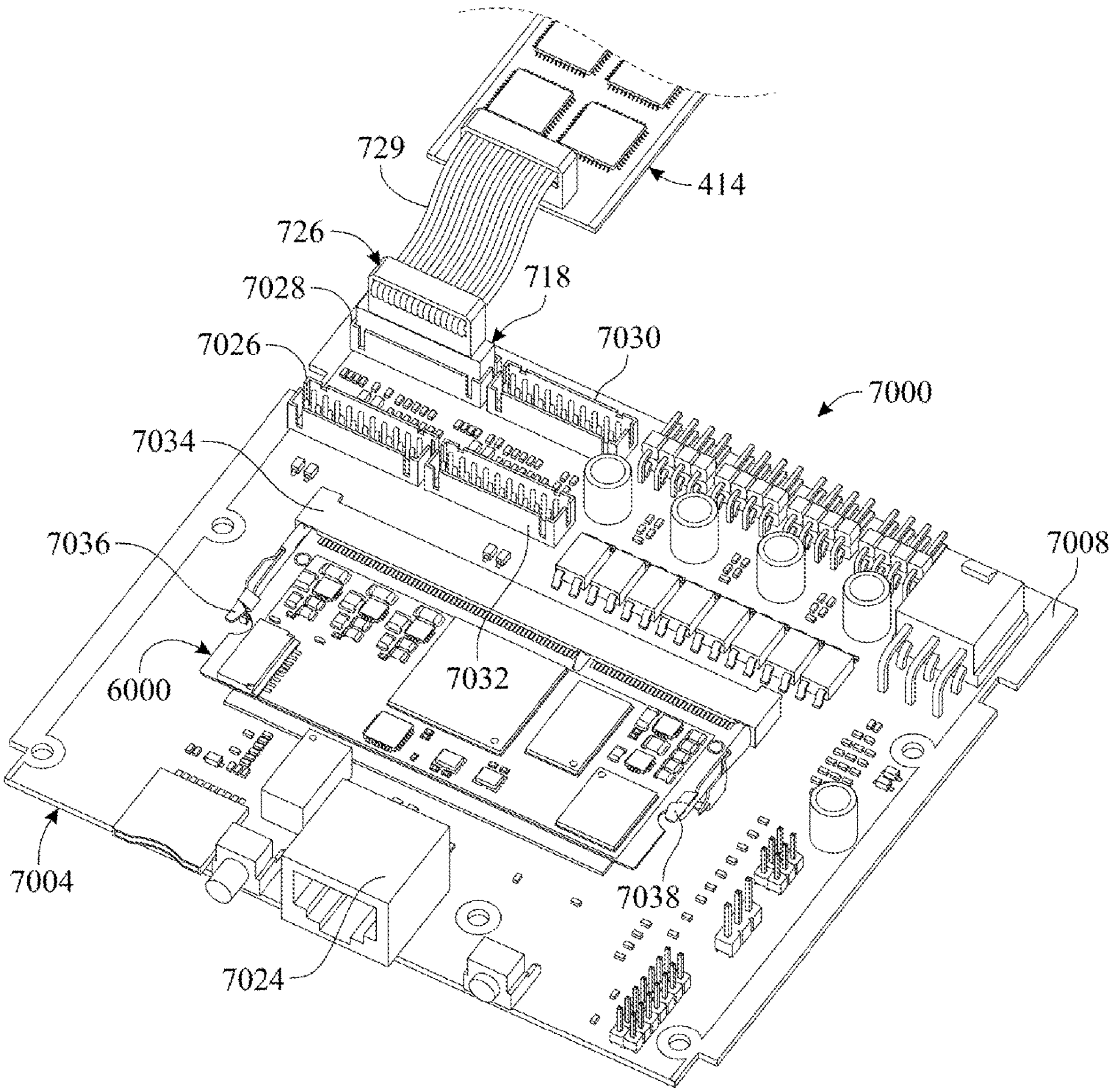
FIG. 19 is a top, perspective view of the universal control board of FIG. 17, showing a hashboard electrically connected to an electrical hashboard connector provided on the interchangeable interface board via, an adapter, in one embodiment of the invention.

Turning now to FIG. 19, there is shown a top, perspective view of the universal control board UCB 7000, showing one hashboard 414 electrically connected to a first electrical hashboard connector comprising a socket connector 7028, via, an adapter 718. Adapter 718 is electrically connected to a ribbon connector 726 provided at the distal end of a ribbon cable 729 electrically coupled to hashboard 414. As better illustrated in FIG. 3D, ribbon connector 726 comprises a total of 16 (8×2) female ports each in electrical continuity with 16 male pins provided on hashboard 414. Adapter 718 electrically couples the ribbon connector 726 comprising 16 female ports, to the socket connector 7028 comprising 20 male pins. Adapter 718 includes 20 female ports to accommodate the 20 male pins on UCB 7000. However, four female ports 732, 734 of adapter 718 remain void, and are not in electrical continuity with an opposite, corresponding male pin. As such, adapters 500, 600, 700, 718 are each adapted to permit users to electrically connect different pluralities of hashboards, each hashboard comprising the same type and/or model, but each different plurality of hashboards comprising a different number of electrical pins or connectors. In practice, three other hashboards 414 would be electrically connected to the remaining three electrical hashboard connectors, via, use of three additional adapters 718.

There is provided a hashboard identification process that determines hashboard identifiers associated with each of the electrically connected hashboards, and a firmware/driver retrieval process that subsequently retrieves firmware instructions or software application program(s) prestored in memory (such as the one or more NAND memory chips), or uploaded into memory from an external device or from a cloud management system, based on the determined hashboard identifiers, where the one or more processors processes and executes the retrieved firmware to communicate with, and control each hashboard electrically connected to any of the universal control boards 200, 2000, 3000, 4000, 5000, or 7000. As noted, one method for identifying hashboard identifiers comprises a manual process where users visually inspect data or information physically provided on a tag or label disposed on each electrically connected hashboard, or on each miner, or information disposed directly on each hashboard or each miner, and subsequently enters the information or data into memory of UCB 200, 2000, 3000, 4000, 5000, or 7000, via a graphic user interface. The entered hashboard identifier is processed to retrieve the correct operating firmware, software, and/or drivers needed for the universal control board 200, 2000, 3000, 4000, 5000, 7000 to communicate with, and control the plurality of electrically connected hashboards. Such information or data provided on the tag or label may include for example, the type and/or model of hashboard, the type and/or model of miner, or the type and/or model of mining chips 401, 403, a model number, a serial number, a brand name, a bin number, or a name of a manufacturer.

Another method for determining hashboard identifiers is achieved by a series of dual in-line package (DIP) switches 232, 234, 236, 238, and 2040, 2042, 2044, 2046 provided on UCB 200, and UCB 3000, respectively. Each DIP switch is manually configured in advance to identify each type and/or model of hashboard that is electrically connected to the plurality of interface connectors 224, 226, 228, 230, and 2032, 2034, 2036, 2038. The DIP switches are operatively associated with each of the plurality of interface connectors. The dual in-line package switches are used to provide variable data inputs for manually assigning hashboard identifiers to each electrically connected hashboard 400, or 402, or 404, or 414 in order to selectively retrieve, and implement the correct, corresponding application firmware, software, and/or drivers needed to effectively operate, and control the electrically connected plurality of hashboards when for example, electrically connected to the I/O interface 202 of UCB 200, or interface 2030 of UCB 2000. Each hashboard identifier is associated with a particular firmware, driver, and/or software program for managing and controlling the hashboards. The data variable inputs represent binary values associated with voltages and/or data signals generated, received, and processed by SOM 241, and SOM 2041.

In yet another method, there is provided an automated hashboard identification process for determining hashboard identifiers associated with a plurality of hashboards that are electrically connected to UCB 200, UCB 2000, UCB 3000, UCB 4000, UCB 5000, UCB 7000 rather than using a manual, visual process, or presetting DIP switches. For example, identifying information or data defining hashboard identifiers is pre-stored in memory such as in one or more NAND chips, or in one or more EPROM, or EEPROM chips, or in peripheral interface controllers PICs provided on each hashboard. Such identifying information or data may include for example, but is not limited to, a model number, a serial number, or a bin number, a voltage, and/or frequency value used to operate each hashboard, a model or serial number of miners, or a total, sum amount of ASIC or IC chips used on each hashboard. In the event there is no EPROM, or EEPROM provided on the hashboards, the hashboard identification process may determine chip data such as the total number of integrated chips 401, 403, (i.e. ASIC chips) provided on each hashboard which is also used to determine the type and/or model of hashboard electrically connected. For example, chip data and/or information can be collected by retrieving or collecting the information that is provided in the internal registers of each IC chip 401, and 403. Instructions defining the hashboard identification process is stored on one or more transitory, or non-transitory computer readable mediums, such as memory provided in SOM 241, SOM 2041, SOM 3041, SOM 4001, or on USOM board 6000, and executed by at least one or more processors to cause miners to perform steps comprising electrically communicating with one or more EPROMs, EEPROMs, PICs that may be provided on each hashboard connected, or to communicate with internal registers of each IC chip to retrieve identifying information or data such as, the model number, serial number, or bin number of each hashboard 400, 402, 404, 414 electrically connected, or of each miner, the value of voltage, and/or frequency of each hashboard, or the number of IC chips of each hashboard. One or more FPGA pins of one or more FPGA chips provided in the system on module circuit are programmed to map GPIO pins for communicating with each electrically connected hashboard 400, or 402, or 404, or or 414, via, designated interface pins provided on each hashboard. An I2C bidirectional serial communication bus controller is provided on one or more FPGA chips and on each hashboard for communicating with the EPROM, or EEPROM chips provided on each hashboard 400, 402, 404, 414, or with the registry of each IC chip 401, and 403.

Upon determining the proper hashboard identifiers for each electrically connected hashboard, either by a manual, visual inspection process, through a DIP switch presetting process, or automatically through use of hashboard identification software, the one or more processors executes instruction to perform a firmware selection and application process. Upon determining the hashboard identifiers, the one or more processors retrieves firmware instructions based on the determined hashboard identifiers, and executes the retrieved firmware instructions to communicate with, and control each identified, hashboard electrically connected to the universal control board UCB 200, 2000, 3000, 4000, 5000, and 7000.

In one embodiment, there is provided a firmware and/or driver library that includes firmware/driver instructions for communicating with, operating, and controlling a plurality of hashboards each electrically connected to a selected universal control board 200, 2000, 3000, 4000, 5000, 7000. It is appreciated that a single firmware library including all necessary firmware, and/or drivers may be employed. The firmware/driver includes any number of different firmware, software, instructions, drivers, data, and code needed for communicating with, managing, or controlling different pluralities of electrically connected hashboards 400, or 402, or 404, or or 414. The drivers may comprise any number of software drivers each configured to control different pluralities of hashboards. The term, "different pluralities of hashboards" generally comprises a group of hashboards, or a plurality of hashboards, where each of the plurality of hashboards, or each hashboard in the group of hashboards, comprises the same make, model and/or type of hashboard. For example, a first group of hashboards, or a first plurality of hashboards comprises hashboards that each comprise a first make, model or type of hashboard where each is associated with a first hashboard identifier; a second group of hashboards, or a second plurality of hashboards comprises hashboards that each comprise a second make, model, or type of hashboard where each is associated with a second hashboard identifier, where the second make, model, or type of hashboard is different in function and construction then the first make, model, or type of hashboard, and, a third group of hashboards, or a third plurality of hashboards comprises hashboards that each comprise a third make, model, or type of hashboard where each is associated with a third hashboard identifier, where the third make, model or type of hashboard is different in function and construction than the first or second make, model, or type of hashboard. Thus, for example, a first plurality of hashboards may include a plurality of hashboards each having a hashboard identifier corresponding to S17 hashboards, a second plurality of hashboards may include a plurality of hashboards each having a hashboard identifier corresponding to S19 hashboards, and a third plurality of of hashboards each having a hashboard identifier corresponding to S19 Pro hashboards. Each hashboard identifier may comprise any of, but not limited to, a S17, S9i, T17, T9, S9 L3, S19, L3, D5, S19 Pro, S7, R4, or Innosilicon A4+ hashboards. It is understood that the list of miners and/or hashboards provided herein is not exhaustive, and other models or types of miners and/or hashboards may be employed. The firmware and/or driver libraries may each include data files, index files, tables, data tables, or look-up tables that include different firmwares, firmware instructions, software, drivers, software programs, application instructions, software drivers, and/or programming codes for operating, and controlling different pluralities of hashboards identified. Thus, for example upon the miner determining that a plurality of hashboards 400 electrically connected to UCB 5000, are identified as being S17 hashboards, the miner analyzes and processes the hashboard identification information, and retrieves the firmware and/or divers needed to communicate with, manage, and control the S17 hashboards from the firmware and/or driver library hosted or stored in memory on USOM board 6000, or alternatively, retrieves the firmware and/or driver library from external storage such as the cloud management system, or an external hard drive or database. One or more processors subsequently executes the retrieved S17 firmware and/or drivers to communicate with, and control each of the plurality of S17 hashboards. In another example, upon determining that a plurality of hashboards 402 connected to the UCB 5000 are identified as S19 hashboards, the miner analyzes and processes the hashboard identification information, and retrieves the firmware and/or divers needed to communicate with, and control the S19 hashboards. One or more processors subsequently executes the retrieved S19 firmware and/or drivers to operate, and control each of the plurality of S19 hashboards. Thus in practice, the firmware/drivers may include first firmware/driver instructions for communicating with a first plurality of hashboards, second firmware/driver instructions for communicating with a second plurality of hashboards, third firmware/driver instructions for communicating with a third plurality of hashboards, and so on, where the first, second, and third firmware/driver instructions are different in operation from each other. First firmware/driver instructions for S17 hashboards, second firmware/driver instructions for S19 hashboards, and third firmware/driver instructions for S19 Pro hashboards. It is understood that the firmware, and/or drivers, or firmware/driver library can be stored or hosted on external memory or storage such as, external servers, remote computers, SD cards, external flash memory devices, or external hard drives, where the cryptocurrency mining machine 100 electrically communicates over a wired or wireless network, via, Ethernet port 5024 for example, or via, a transceiver, or wireless network, to retrieve the operating firmware and/or drivers from the corresponding firmware and/or driver libraries to control and operate each hashboard electrically connected to the UCB 5000.

Figure 20:
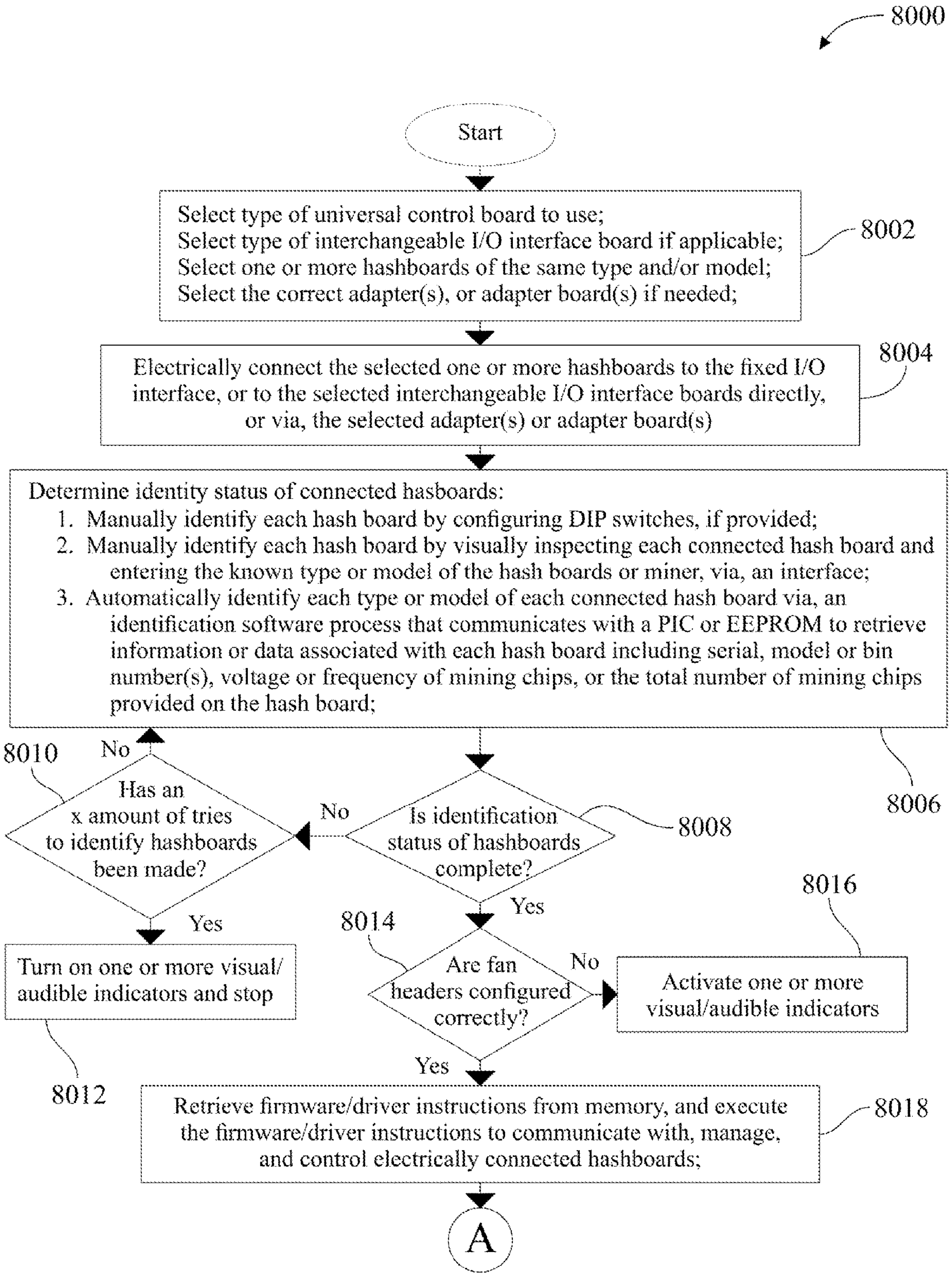
FIGS. 20 and 21 is a flow chart illustrating steps for electrically connecting different pluralities of hashboards, each plurality of hashboards being the same type and/or model, to a universal control board that is functionally configured to communicate with, and control each electrically connected hashboard for effectively mining digital currency.
Figure 21:
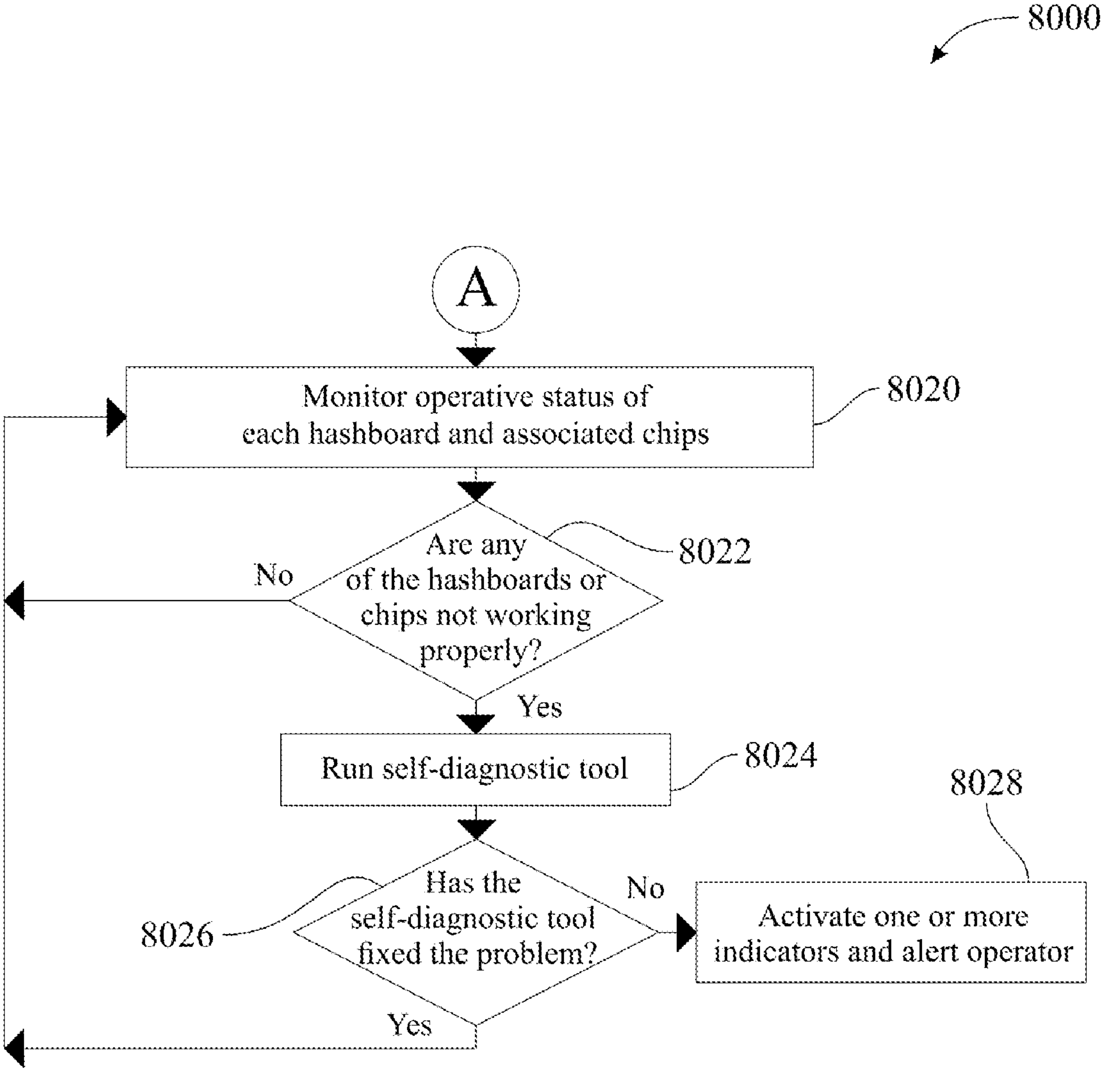

Turning now to FIGS. 20 and 21, there is shown a flow chart for illustrating the steps and processes undertaken when initially configuring miners, and electrically connecting different pluralities of hashboards to any universal control board UCB 200, UCB 2000, UCB 3000, UCB 4000, UCB 5000, or UCB 7000 for mining digital currency. An initial configuration process begins at step 8002 where users initially select 1). the type of universal control board UCB 200, UCB 2000, UCB 3000, UCB 4000, UCB 5000, UCB 7000 wishing to use, 2). the type of interchangeable I/O interface board 2030, 2060, 3018, 4016, 5004, or 7004 if one is used, and 3). a plurality of hashboards 400, or a plurality of hashboards 402, or a plurality of hashboards 404, or a plurality of hashboards 414. For illustrative purposes, a user selects a universal control board 7000 along with a plurality of hashboards 414, as better illustrated in FIG. 19 (though only a single hashboard 414 is shown). Upon selecting the necessary mining equipment, at step 8002, at step 8004, users subsequently determine whether the selected hashboards 414 can be directly, electrically connected to socket connectors 7026, 7028 7030, 7032 of the UCB 7000, or whether an adapter 718, or adapter board is needed. In reference to another example, it is appreciated that users would determine whether selected hashboards can be directly, electrically connected to the interface connectors 224, 226, 228, 230 provided on I/O interface 202 on UCB 200 should a UCB 200 be selected. Adapters 500, 600, 700 are selected in accordance with the type of ribbon connector associated with the ribbon cables employed one each selected hashboard. For example, an S17 hashboard may have a different electrical ribbon connector than an S19 hashboard requiring use of a different adapter 500, 600, and 700. Alternatively, users may choose an adapter board 800, 900, 1000 each including different electrical connectors 808, 810, 812, 814, 908, 910, 912, 914, 1008, 1010, 1012, 1014 for accommodating electrical connections of different ribbon connectors associated with different ribbon cables used with different hashboards.

With continued reference to the exemplary illustration per the flowchart, upon electrically connecting each of the plurality of hashboards 414 to the socket connectors 7026, 7028 7030, 7032 of UCB 7000, there is provided a hashboard identification process at step 8006. In step 8006, a hashboard identification process is initiated to determine the identity of each electrically connected plurality of hashboards 414 to UCB 7000 in order to retrieve, and implement the proper operative firmware, software, and/or drivers needed for the UCB 7000 to electrically communicate with, and control the electrically connected hashboards 414. The hashboard identification process may comprise three methods including manual configuration methods, or alternatively, an automated hashboard identification method. Instructions defining the hashboard identification process is stored in one or more transitory, or non-transitory computer readable mediums, such as NAND memory provided on the USOM board 6000, and executed by at least one or more processors to cause miners to perform steps comprising electrically communicating with one or more EPROMs, EEPROMs, or PICs that may be provided on each hashboard connected, or to communicate with internal registers of each IC chip provided on the connected hashboards to retrieve hashboard identification information or data such as, a model number, a serial number, or a bin number of each hashboard, or miner, or the sum total of IC chips provided on each hashboard.

In circumstances where a UCB 200 was selected, or alternatively where a UCB 3000 was selected, users undertake a manual configuration method involving configuring DIP switches 232, 234, 236, 238 to provide variable data inputs that comprise binary values of 00, 01, 10, 11 that are each associated with hashboard identifiers corresponding to each electrically connected hashboard 404. Each hashboard identifier corresponds to a particular brand, make, model, and/or type of hashboard connected. The binary values correspond to voltage values that are processed by the one or more processors of the SOM 241, or SOM 3041, and used to selectively retrieve the operative firmware and/or drivers from a firmware library, and/or a driver library for the UCB 200, or UCB 3000 to communicate with each electrically connected hashboard. For example, if each toggle of each DIP switch is set to an OFF position, there is provided a binary value of 00 that corresponds to a first voltage value associated with a particular hashboard identifier such as S17 hashboard. Thus, manually positioning each toggle of each DIP switch to an OFF and/or ON positon allows the one or more processors to identify the model and/or type of each hashboard 404 electrically connected where in step 8018, the correct firmware and/or drivers is retrieved from the respective firmware library, and driver library, and implemented to communicate with, and control the S17 hashboards. Each toggle switch of each DIP switch can be set to other variable data inputs corresponding to other models and/or types of hashboards connected to a UCB having DIP switches such as UCB 200, such as UCB 3000.

Step 8006 provides another manual process that includes a visual/input manual process which entails visually inspecting each electrically connected hashboard or miner to gather hashboard identification information or data that is provided on a label disposed on, or directly printed on, each hashboard or miner to identify the type and/or model of hashboards electrically connected to the universal control board employed. Operators visually gather the hashboard identifier information, and subsequently enter the hashboard identifying information into memory provided in the system on module circuit via, a graphic user interface provided on a remote device such as desktop computer that communicates with the miners. Upon entering the hashboard identification information into memory, the one or more processors of the system on module circuit communicates with the memory, and pursuant to step 8018, retrieves the proper firmware/drivers based on the entered hashboard identification information, and implements the selected firmware/drivers to operatively communicate with, and control the plurality of electrically connected hashboards.

In the continued example, once steps 8002 through 8006 are completed, UCB 7000 initiates a hashboard identification status check at step 8008 to determine and confirm whether each electrically connected hashboard 414 comprises the same model and/or type. Thus, during the identification status check, a comparing analysis compares the hashboard information and/or data of each hashboard to confirm that each electrically connected hashboard comprises the same model and/or type. If it is determined that at least one electrically connected hashboard has a different hashboard identifier assigned to it indicating a different model or type, a visual and/or audible indicator is generated, and the process continues to step 8010. In step 8010, the hashboard identification status check continues to determine and compare the hashboard identification information of each electrically connected hashboard until an X amount of attempts have been made to correctly assign, and confirm identical hashboard identifiers for each electrically connected hashboard. An X amount of attempts may be preset, or preconfigured by operators in advance, and may include a time duration such as checking for a total of 10 minutes, or a set number of attempts such as checking a total of 5 times, or may be conducted at set times such as checking every 5 minutes over a period of 15 minutes. Once a preset X amount of times is exhausted, the USOM board 6000 activates a visual and/or audible indicator(s) in step 8012 to alert operators, and the identification status check process terminates.

If the hashboard identification process is successful, the process moves to step 8014 where a fan configuration process is initiated to properly configure the electrical connection and operation of cooling fans 104, 106, as shown in FIG. 1. During the fan configuration process 8014, UCB 7000, via, USOM board 6000, transmits data communication signals to each fan header 7010, 7012, 7014, 7016, as illustrated in FIG. 17, to determine whether fans are electrically connected to each fan header, and if so, whether the electrical connection provides for a two-wire on/off fan control, or for pulse width modification PWM fan control. If it is determined after analyzing the data communication signals, that the electrical connection of each fan requires PWM control, USOM board 6000 communicates with the fan module 203 to provide PWM control to each fan 104 and 106. Otherwise the one or more processors initiate, per instructions from firmware, an on/off mode of operation for each fan where each fan is turned on at a particular speed. If pursuant to step 8014, it is determined that the fans are not electrically connected, or not correctly configured, UCB 7000 powers one or more indicators at step 8016 to alert operators. However, if each fan is properly electrically connected to each fan header, the process moves forward to step 8018. It is appreciated that in circumstances where miners do not use fans, and rather employ liquid cooling, the fan module and step 8014 may be disabled.

A firmware selection, retrieval, and application process is subsequently initiated at step 8018. Executable instructions defining a firmware/driver selection and application process is stored on one or more transitory, or non-transitory computer readable mediums, such as memory provided USOM board 6000, and executed by at least one or more processors to cause miners to process determined hashboard identifiers for each hashboard electrically connected to the UCB 7000, and to implement the correct operating firmware, software, and/or drivers needed to operate, control, and communicate with, each identified, and electrically connected hashboard 414. In one example, the firmware and/or drivers is/are retrieved from a firmware/driver libraries or look-up tables stored in memory on USOM board 6000, or stored on an external storage device, or cloud management system. The firmware and/or drivers are implemented to operate and control different pluralities of hashboards.

Upon retrieving and implementing the correct firmware and/or drivers to communicate with, control, and manage each hashboard 414 electrically connected to the UCB 7000, an operational monitoring process denoted at steps 8020, 8022 is initiated to monitor operational metrics including for example, voltage and/or frequency of each IC chip or hashboard, supply voltage, processor usage, power consumption, temperatures of IC mining chips and/or hashboards, mining profits, fan speed, chip or hashboard function, or other data. If an issue or problem is detected, the selected firmware may initiate a self-diagnostic test at step 8024 to self-diagnose and correct problematic issues. If the self-diagnostic step 8024 is satisfied, then the monitoring process continues at step 8020. However, if the self-diagnostic step 8024 detects a continued problem attributed to any of the hashboards, IC chips, the UCB 7000, or interface board 7004, step 8028 generates one or more visual and/or audible indicators to alert operators.

Various dynamic tuning firmware and/or drivers each comprising software, instructions, computer code, application(s) and/or program(s) for effectively and efficiently controlling, managing, and communicating with, each electrically connected hashboard 400, 402, 404, 414 and ASIC chips 401, 403 is also provided. The dynamic tuning firmware and/or drivers allow operators to preconfigure various operational parameters through graphic user interfaces, including the ability to select or preconfigure chip profile configurations, user-defined profile configurations, target chip temperatures, profit analysis and variables, and for selectively disabling, or enabling certain modes of operation affiliated with each cryptocurrency mining machine. Chip profile configurations may include, inter alia, a voltage profile range including a maximum and minimum chip voltage, and a frequency profile range including a maximum and minimum chip frequency; a chip and/or hashboard temperature control/management that electrically communicates with the selected UCB 200, 2000, 3000, 4000, 5000, 7000 via, PIC 412 to control fans 104, 106 for managing the operating temperature of ASIC chips 401, 403, and/or hashboards 400. Each firmware may provide auto-tuning control for dynamically adjusting voltages, and frequencies associated with the voltage and frequency profile ranges, respectively, to determine tuned parameters including a target chip voltage, and target chip frequency to provide efficient power usage, and optimal hash rate when applied to ASIC chips. During an auto-tuning process, voltage and frequency values provided in each voltage and frequency profile range associated with each selected chip profile configuration, are dynamically adjusted until a target chip voltage, and target chip frequency that provides the lowest power consumption at the highest chip hash rate is found. Auto-tuning adjusts the chip voltage, and chip frequency, of each profile range, to determine a target chip voltage, and target chip frequency for each IC chip 401, 403 to provide low power usage, and optimal hash rates to optimally manage chip temperature and operating costs, and to garner the highest profits. Each firmware may collect, monitor, process, manage, analyze, and store metric data associated with various performance factors including: data or information used during auto-tuning. Further, each firmware may include a profit analysis process that provides profit variable management when mining digital currency, and provide a profit algorithm that employs profit variables to apply tuned parameters that generate the highest profits. The firmware may include auto-switch control to selectively switch between chip profile configurations based on various condition parameters. Also, operators can preset user-defined profile configurations to manually preset user-defined chip profile configurations. Each firmware provides for a start-up phase and core initialization process for powering on the ASIC chips 401, 403 and other electronic components, and initialize chip cores to begin auto-tuning. It is appreciated that other dynamic tuning processes associated with controlling and controlling and managing electrically connected hashboards, and cryptocurrency mining machine 100 may be provided. For example, additional tuning processes may include configuration and functionality of peripheral interface controllers PIC 412, and providing upgrades associated with firmware, drivers, machine learning, or miner management software.

In a preferred embodiment, the dynamic tuning firmware/drivers is/are stored in a machine-readable executable medium, or a non-transitory machine-readable executable medium hosted in memory provided on each universal control board 200, 2000, 3000, 4000, 5000, 7000 of the cryptocurrency mining machine 100. Alternatively, each dynamic tuning firmware may be hosted on a remote computing device, on one or more external servers, or on a cloud-based system where cryptocurrency mining machines can access, and retrieve various functionalities or processes associated with the dynamic tuning firmware programs, computer code, and instructions, via, a wired or wireless communication network. Each dynamic tuning firmware provides the necessary program user-interfaces (e.g. interface screens) needed for users to communicate, interact, manage, control, and exchange information with cryptocurrency mining machine 100. In one non-limiting embodiment, the user-interface may comprise a graphical user interface, a software interface, a hardware interface, or any combination thereof for enabling users to view, edit, change, add, create, manipulate, input, save or store, print, command, submit, transfer, manage, navigate, and import/export, any and all data, information, bits, values, elements, figures, symbols, characters, terms, numbers, or graphs, associated with cryptocurrency mining machines 100. Such interface(s) may include any number of screens each including any number of icons, banners, drop down menus, entry boxes, designated inputs, check boxes, tabs, inserts, pop-ups, query boxes, rows or columns of data or information, libraries, spreadsheets, expandable windows, scrolls, tables, menus, and other designed formats or configurations to permit users to view, modify, enter and remove data, information, values, digits, bars, charts, colors, or percentage values.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A universal control board configured to communicate with a plurality of hashboards each including a plurality of mining chips for use in cryptocurrency mining machines, said universal control board comprising:

an interchangeable interface board comprising a first printed circuit board including an Ethernet circuit having an Ethernet port, said Ethernet circuit adapted to communicate with an external device over a wired or wireless network, a power circuit including a power connector for receiving an external power source, a plurality of electrical hashboard connectors, and an electrical board connector;

a universal system on module board comprising a second printed circuit board including electrical board contacts electrically coupled to a system on module circuit, said system on module circuit including one or more processors in electrical communication with memory via, a memory interface, said universal system on module board removeably, electrically connected to said interchangeable interface board such that said electrical board contacts removably engage said electrical board connector where the Ethernet circuit, power circuit, plurality of electrical hashboard connectors, and electrical board connector are electrically interfaced to said system on module circuit, said power circuit selectively powering said interchangeable interface board and said universal system on module board;

where said one or more processors operates to electrically communicate with each of said plurality of hashboards removably, electrically connected to each of said plurality of electrical hashboard connectors to determine hashboard identifiers associated with each of said plurality of hashboards;

where subsequent to determining said hashboard identifiers of each of said plurality of hashboards, said one or more processors comparing each of said hashboard identifiers to each other to determine that each of said plurality of hashboards comprises a same hashboard identifier associated with a same type or model hashboard; and where upon determining that each of said plurality of hashboards comprises the same hashboard identifier, said one or more processors communicating with said memory to retrieve a firmware from a plurality of firmware and executing said retrieved firmware to communicate with and control each of said plurality of hashboards.

2. The universal control board of claim 1, wherein each of said plurality of electrical hashboard connectors comprise any of one or more socket connectors, or one or more plug-in connectors.

3. The universal control board of claim 2, wherein said one or more processors includes any of one or more central processing units, one or more main processing units, one or more micro-processing units, and one or more field programmable gate array chips, or any combination thereof, and wherein said memory includes any of one or more memory management units, one or more DDR memory chips, and one or more NAND memory chips.

4. The universal control board of claim 3, wherein each of said plurality of firmware comprises computer-executable firmware instructions hosted in said memory, or uploaded into said memory from an external device or from a cloud management system communicatively accessible over said wired or wireless network by said Ethernet circuit, each of said plurality of firmware associated with different pluralities of hashboards, each plurality of hashboards comprising a different type or model hashboard.

5. The universal control board of claim 4, wherein said plurality of firmware includes a first firmware comprising first firmware instructions for communicating with and controlling each of a first plurality of hashboards based on first hashboard identifiers associated with each of said first plurality of hashboards, and a second firmware comprising second firmware instructions for communicating with, and controlling each of a second plurality of hashboards based on second hashboard identifiers associated with each of said second plurality of hashboards, said first hashboard identifiers associated with a first type or first model hashboard, and said second hashboard identifiers associated with a second type or second model hashboard, said one or more processors retrieving and executing each of said plurality of firmware one at a time where simultaneous retrieval and execution of multiple firmware is restricted.

6. The universal control board of claim 5, wherein each of said hashboard identifiers comprise any of a sum total number of said plurality of mining chips provided on each of said plurality of hashboards, or a model number, a serial number, a brand name, a bin number, or a name of a manufacturer associated with each of said cryptocurrency mining machine housing said plurality of hashboards, or with each of said plurality of hashboards.

7. The universal control board of claim 6, wherein each of said hashboard identifiers are prestored in any of one or more electrically erasable programmable read-only EEPROM chips, one or more erasable programmable read-only EPROM chips, or a peripheral interface controller provided on each of said plurality of hashboards, said hashboard identifiers optionally physically depicted on each of said plurality of hashboards, or on each of said cryptocurrency mining machines and manually programmed into said memory by users.

8. The universal control board of claim 7, wherein each of said plurality of electrical hashboard connectors includes a predetermined number of general purpose input-output pins, said one or more field programmable gate array chips programmed to map said predetermined general purpose input-output pins to transmit communicating signals to each of said plurality of hashboards and retrieve said hashboard identifiers stored in said one or more electrically erasable programmable read-only chips, said one or more erasable programmable read-only chips, or said peripheral interface controller.

9. The universal control board of claim 8, wherein said system on module circuit further includes any of one or more universal asynchronous receiver-transmitter chips, or a chip peripheral interface that electrically communicate with said one or more electrically erasable programmable read-only chips, with said one or more erasable programmable read-only chips, or said peripheral interface controller, via, said general purpose input-output pins to retrieve said hashboard identifiers when each of said plurality of hashboards is electrically connected to each of said plurality of electrical hashboard connectors.

10. The universal control board of claim 4, wherein each of said plurality of said firmware includes a plurality of drivers, each of said plurality of drivers comprising programming instructions, where upon selectively operating said one or more processors, said one or more processors retrieves one of said plurality of drivers based on said one or more processors determining that each of said plurality of hashboards comprises a same hashboard identifier, and executes said programming instructions to communicate with and control each of said plurality of hashboards electrically connected to each of said plurality of electrical hashboard connectors.

11. The universal control board of claim 1, wherein said interchangeable interface board further includes at least one fan headers for electrically controlling cooling fans removably attachable to said at least one fan header, said at least one fan header disposed on said first printed circuit board adjacent said plurality of electrical hashboard connectors.

12. The universal control board of claim 11, wherein said at least one fan header comprises at least two fan headers for electrically connecting cooling fans removable attachable to said at least two fan headers.

13. The universal control board of claim 1, wherein said electrical board connector comprises a peripheral component interconnect-x connector, a peripheral component interconnect express connector, a mini-peripheral component interconnect connector, or a sodimm connector.

14. The universal control board of claim 1, wherein said interchangeable interface board includes a rectangular opening formed completely through said first printed circuit board adjacent said electrical board connector, said rectangular opening disposed beneath one surface of said universal system on module board electrically connected to said interchangeable interface board.

15. The universal control board of claim 1, wherein said interchangeable interface board comprises a first interchangeable interface board including a plurality of socket connectors, each of said plurality of socket connectors including at least 16 male pins to accommodate electrical connectors associated with each of said plurality of hashboards.

16. The universal control board of claim 1, further including a plurality of adapters, each of said plurality of adapters including a plurality of electrical adapter connectors comprising a plurality of female ports in electrical continuity with a corresponding plurality of male pins, each of said plurality of adapters electrically connecting each of said plurality of hashboards to said plurality of electrical hashboard connectors.

17. The universal control board of claim 16, wherein said plurality of female ports includes at least 16 female ports, and said corresponding plurality of male pins includes at least 16 male pins.

18. The universal control board of claim 1, further including a plurality of adapter boards, each adapter board including a plurality of electrical adapter connectors comprising a plurality of female ports in electrical continuity with a corresponding plurality of male pins, one of said plurality of adapter boards including two electrical adapter connectors aligned next to each other along a first horizontal axis, said two electrical adapter connectors adjacent to, and in parallel with, another two electrical adapter connectors aligned next to each other along a second horizontal axis, another of said adapter boards including a second plurality of electrical adapter connectors, each of said second plurality of electrical adapter connectors aligned adjacent to, and in parallel with, each other along a vertical axis, each of said plurality of adapter boards removably attachable to each of said plurality of electrical hashboard connectors to electrically connect each of said plurality of hashboards to each of said plurality of electrical hashboard connectors.

19. The universal control board of claim 18, wherein said plurality of female ports includes at least 16 female ports, and said corresponding plurality of male pins includes at least 16 male pins.

20. The universal control board of claim 1, wherein said interchangeable interface board further includes a JAG connector, a UART connector, and an I2C interface connector all electrically interfaced with said system on module circuit.

21. The universal control board of claim 1, further including light emitting diodes for indicating operational metrics of said universal board, said light emitting diodes electrically coupled to, and controlled by, said one or more processors on said universal system on module board, said one or more processors powering one of said light emitting diodes based on an operation metric comprising at least one of said plurality of hashboards having a different hashboard identifier than a remainder of said plurality of hashboards.

22. A universal control board configured to communicate with a plurality of hashboards each including a plurality of mining chips for use in cryptocurrency miners, said universal control board comprising:

a system on module board including an Ethernet circuit having an Ethernet port, said Ethernet circuit adapted to communicate with an external device over a wired or wireless network, a power circuit including a power connector for receiving an external power source, a first electrical board connector, and a system on module circuit including one or more processors, and memory, said one or more processors in electrical communication with said memory via, a memory interface;

removable interface board including at least one fan headers, a power data connector for receiving a power data cable, a plurality of interface connectors, and a second electrical board connector, said removable interface board removeably, electrically connected to said system on module board such that said first electrical board connector electrically engages said second electrical board connector where said at least one fan headers, Ethernet circuit, power circuit, plurality of interface connectors, electrical board connectors, and data connector are electrically interfaced to said system on module circuit, said power circuit selectively powering said removable interface board and said system on module board;

where said one or more processors operates to electrically communicate with each of said plurality of hashboards removably electrically connected to each of said plurality of interface connectors to determine hashboard identifiers associated with each of said plurality of hashboards;

where subsequent to determining said hashboard identifiers of each of said plurality of hashboards, said one or more processors comparing each of said hashboard identifiers with each other to determine that each of said hashboard identifiers comprises a same hashboard identifier associated with a same type or model hashboard; and where upon determining that each of said plurality of hashboards comprises the same hashboard identifier, said one or more processors communicating with said memory to retrieve firmware from a plurality of firmware and executing said retrieved firmware to communicate with and control each of said plurality of hashboards.

23. The universal control board of claim 22, wherein each of said plurality of interface connectors comprise any of one or more socket connectors, one or more plug-in connectors, one or more bayonet connectors, or a plurality of male-pin connectors.

24. The universal control board of claim 23, wherein said one or more processors includes any of one or more central processing units, one or more main processing units, one or more micro-processors, and one or more field programmable gate array chips, or any combination thereof, and said memory includes any of one or more DDR memory chips, one or more NAND memory chips, or any combination thereof.

25. The universal control board of claim 24, wherein each of said plurality of firmware comprises computer-executable firmware instructions hosted in said memory, or uploaded into said memory from an external device or from a cloud management system communicatively accessible over said wired or wireless network by said Ethernet circuit, each of said plurality of firmware associated with different pluralities of hashboards, each plurality of hashboards comprising a different type or model hashboard.

26. The universal control board of claim 25, wherein said plurality of hashboards includes any of a first plurality of hashboards each having a first hashboard identifier, and a second plurality of hashboards each having a second hashboard identifier different than said first hashboard identifier, each of said first plurality of hashboards comprising a first type or model hashboard, and each of said second plurality of hashboards comprising a second type or model hashboard different from said first type or model hashboard, said one or more processors retrieving and executing each of said plurality of firmware one at a time where simultaneous retrieval and execution of multiple firmware is restricted.

27. The universal control board of claim 26, wherein each of said hashboard identifiers comprise any of sum total number of said plurality of mining chips provided on each of said plurality of hashboards, or any of a model number, a serial number, a brand name, a bin number, or a name of a manufacturer associated with each of said cryptocurrency miners housing said plurality of hashboards, or with each of said plurality of hashboards.

28. The universal control board of claim 27, wherein said hashboard identifiers are prestored in any of one or more electrically erasable programmable read-only chips, one or more erasable programmable read-only chips, or a peripheral interface controller provided on any of each of said plurality of hashboards, or said hashboard identifiers are physically depicted on each of said plurality of hashboards, or on each of said cryptocurrency miners, and manually programmed into said memory by users.

29. The universal control board of claim 28, wherein each of said plurality of interface connectors includes a predetermined number of general purpose input-output pins, said one or more field programmable gate array chips programmed to map said predetermined general purpose input-output pins to transmit communicating signals to each of said plurality of hashboards and retrieve said hashboard identifiers associated with each of said plurality of hashboards from said one or more electrically erasable programmable read-only chips, erasable programmable read-only chips, or said peripheral interface controller.

30. The universal control board of claim 29, wherein said system on module circuit further includes any of one or more universal asynchronous receiver-transmitter chips, or a chip peripheral interface that electrically communicate with said one or more electrically erasable programmable read-only chips, erasable programmable read-only chips, or said peripheral interface controller, via, said general purpose input-output pins to retrieve said hashboard identifiers associated with each of said plurality of hashboards is-electrically connected to each of said plurality of interface connectors.

31. The universal control board of claim 25, wherein each of said plurality of firmware includes a plurality of drivers, each of said plurality of drivers comprising programming instructions, where upon selectively operating said one or more processors, said one or more processors retrieves one of said plurality of drivers based on said one or more processors determining each of said plurality of hashboards comprises a same hashboard identifier, and executes said programming instructions to communicate with and control each of said plurality of hashboards electrically connected to each of said plurality of interface connectors.

32. The universal control board of claim 22, wherein said first and second electrical board connector comprises a plug-in configuration.

33. The universal control board of claim 22, wherein said removable interface board comprises a first removable interface board including said plurality of interface connectors each having at least 14 male pins.

34. The universal control board of claim 22, further including a plurality of adapters, each adapter including a plurality of electrical adapter connectors comprising a plurality of female ports in electrical continuity with a corresponding plurality of male pins, each of said plurality of adapters electrically connecting each of said plurality of hashboards to said plurality of interface connectors.

35. The universal control board of claim 34, wherein said plurality of female ports includes at least 16 female ports, and said corresponding plurality of male pins includes at least 16 male pins.

36. The universal control board of claim 22, further including a plurality of adapter boards, each adapter board including a plurality of electrical adapter connectors comprising a plurality of female ports in electrical continuity with a corresponding plurality of male pins, one of said plurality of adapter boards including two electrical adapter connectors aligned next to each other along a first horizontal axis, said two electrical adapter connectors adjacent to, and in parallel with, another two electrical adapter connectors aligned next to each other along a second horizontal axis, and another of said plurality of adapter boards including a second plurality of electrical adapter connectors, each of said second plurality of electrical adapter connectors aligned adjacent to, and in parallel with, each other along a vertical axis, each of said plurality of adapter boards removably connected to each of said plurality of interface connectors to electrically connect each of said plurality of hashboards to each of said plurality of interface connectors.

37. The universal control board of claim 36, wherein said plurality of female ports includes at least 16 female ports, and said corresponding plurality of male pins includes at least 16 male pins.

38. The universal control board of claim 22, further including light emitting diodes for indicating operational metrics of said universal control board, said light emitting diodes electrically coupled to, and controlled by, said one or more processors on said system on module circuit, said one or more processors powering on one of said light emitting diodes based on an operational metric comprising at least one of said plurality of hashboards comprising a different hashboard identifier than a remainder of said plurality of hashboards.

39. A universal control board configured to communicate with a plurality of hashboards provided in cryptocurrency miners, said universal control board comprising:

a system on module board comprising;

a system on module circuit including one or more processors in electrical communication with memory via, a memory interface;

an Ethernet circuit including an Ethernet port, said Ethernet circuit adapted to communicate with an external device over a wired or wireless network;

at least one fan header;

a power circuit including a power connector for receiving an external power source; a data cable connector for receiving a data cable electrically coupled to a power supply unit; and a first electrical board connector;

an interchangeable interface board including a plurality of interface connectors, and a second electrical board connector, said interchangeable interface board removeably, electrically connected to said system on module board such that said first electrical board connector electrically engages said second electrical board connector, where said Ethernet circuit, said at least one fan header, said power circuit, said data cable connector, said plurality of interface connectors, and said first and second electrical board connectors are electrically interfaced with said system on module circuit, said power circuit selectively powering said interchangeable interface board and said universal system on module board;

where said one or more processors operates to electrically communicate with each of said plurality of hashboards removable, electrically connected to each of said plurality of interface connectors to determine hashboard identifiers associated with each of said plurality of hashboards;

where subsequent to determining said hashboard identifiers of each of said plurality of hashboards, said one or more processors comparing each of said hashboard identifiers with each other to determine that each of said hashboard identifiers comprises a same hashboard identifier, each hashboard identifier associated with a same type or model hashboard; and where upon determining that each of said plurality of hashboards comprise the same type or model hashboard, said one or more processors communicating with said memory to retrieve firmware from a plurality of firmware and executing said retrieved firmware to communicate with and control each of said plurality of hashboards.

40. The universal control board of claim 39, wherein each of said plurality of interface connectors comprise any one of a socket connector, or a plug-in connector.

41. The universal control board of claim 40, wherein said interchangeable interface board further includes a plurality of electrical switches each electrically coupled to a respective one of said plurality of interface connectors, said second electrical board connector, and said system on module circuit, via, said first electrical board connector, each of said plurality of electrical switches configured by users to provide a binary value processed by said one or more processors to assign a hashboard identifier to each of said plurality of hashboards, each of said assigned hashboard identifiers defining a same type or model hashboard.

42. The universal control board of claim 41, wherein each of said plurality of electrical switches comprises any of a dip switch, a toggle switch, and a rocker switch.

43. The universal control board of claim 42, wherein a first, a second, a third, and a fourth dip switch are each disposed adjacent a first, a second, a third, and a fourth of said plurality of interface connectors, respectively, on said interchangeable interface board.

44. The universal control board of claim 41, wherein said one or more processors includes any of one or more central processing units, one or more main processing units, one or more micro-processors, and one or more field programmable gate array chips, or any combination thereof, and said memory includes any of one or more DDR memory chips, one or more NAND memory chips, or any combination thereof.

45. The universal control board of claim 44, wherein each of said plurality of firmware comprises computer-executable firmware instructions stored in a firmware library hosted in said memory, or uploaded into said memory from an external device or from a cloud management system that is communicatively accessible over said wired or wireless network by said Ethernet circuit, each of said plurality of firmware associated with different pluralities of hashboards where each different plurality of hashboards comprises a different type or model hashboard.

46. The universal control board of claim 45, wherein said firmware library includes first firmware comprising first firmware instructions for communicating with a first plurality of hashboards based on first hashboard identifiers associated with said first plurality of hashboards, second firmware comprising second firmware instructions for communicating with a second plurality of hashboards based on second hashboard identifiers associated with said second second plurality of hashboards, third firmware comprising third firmware instructions for communicating with a third plurality of hashboards based on third hashboard identifiers associated with said third plurality of hashboards, said first, second, and third hashboard identifier associated with a first, second, and third type or model hashboard, respectively, each of said first, second and third type or model hashboard comprising a different type or model hashboard, said one or more processors retrieving and executing each firmware from said firmware library one at a time where simultaneous retrieval and execution of multiple firmware is restricted.

47. The universal control board of claim 45, wherein each of said hashboard identifiers are associated with a binary value settable by said electrical switches, each binary value defining any of a sum total number of mining chips provided on each of said plurality of hashboards, a model number, a serial number, a brand name, a bin number, or a name of a manufacturer that is associated with each of said cryptocurrency miners housing said plurality of hashboards, or associated with each of said plurality of hashboards.

48. The universal control board of claim 47, wherein each of said plurality of interface connectors includes a predetermined number of general purpose input-output pins, said one or more field programmable gate array chips programmed to map said predetermined general purpose input-output pins to transmit communicating signals to each of said plurality of hashboards or to each electrical switch and retrieve said hashboard identifiers or said binary values configured from each of said plurality of electrical switches, said hashboard identifiers or said binary values stored in one or more electrically erasable programmable read-only chips, one or more erasable programmable read-only chips, or a peripheral interface controller provided on each of said plurality of hashboards, in said DDR memory, or in said NAND memory.

49. The universal control board of claim 48, wherein said system on module circuit further includes any of one or more universal asynchronous receiver-transmitter chips, or a chip peripheral interface for electrically communicating with said one or more electrically erasable programmable read-only chips, erasable programmable read-only chips, or said peripheral interface controller, via, said general purpose input-output pins to retrieve said hashboard identifiers or said binary values associated with each of said plurality of hashboards electrically connected to each of said plurality of interface connectors.

50. The universal control board of claim 45, wherein said firmware library includes a plurality of drivers, each comprising programming interface instructions where upon selectively operating said one or more processors, said one or more processors retrieves one of said plurality of drivers based on said one or more processors determining each of said plurality of hashboards comprises a same hashboard identifier, and executes said programming interface instructions to communicate with and control each of said plurality of hashboards electrically connected to each of said plurality of interface connectors.

51. The universal control board of claim 39, wherein said first and second electrical board connector comprises a plug-in configuration.

52. The universal control board of claim 39, wherein said interchangeable interface board comprises a first interchangeable interface board including said plurality of interface connectors each having at least 14 male pins.

53. The universal control board of claim 39, further including a plurality of adapters, each adapter including a plurality of electrical adapter connectors comprising a plurality of female ports in electrical continuity with a corresponding plurality of male pins, each of said plurality of adapters electrically connecting each of said plurality of hashboards to said plurality of interface connectors.

54. A universal control board configured to communicate with a plurality of hashboards used in cryptocurrency miners, said universal control board comprising:

a printed circuit board including:

a system on module circuit including one or more processors in electrical communication with memory, via a memory interface;

an Ethernet circuit including an Ethernet port for communicating with an external device over a wired or wireless network;

at least one fan headers;

a power circuit including a power connector for receiving an external power source; a data cable connector for receiving a data cable electrically coupled to a power supply unit; and a plurality of interface connectors for electrically connecting said plurality of hashboards;

wherein said Ethernet circuit, said at least one fan headers, said power circuit, said data cable connector, and said plurality of interface connectors are electrically interfaced to said system on module circuit and powered by said power circuit;

wherein said one or more processors operates to electrically communicate with each of said plurality of hashboards removably, electrically connected to said plurality of interface connectors to determine hashboard identifiers associated with each of said plurality of hashboards;

wherein subsequent to determining said hashboard identifiers of each of said plurality of hashboards, said on or more processors comparing each of said hashboard identifiers with each other to determine that each of said hashboard identifiers comprises a same hashboard identifier associated with a same type or model hashboard; and wherein upon determining that each of said plurality of hashboards comprises a same type or model hashboard, said one or more processors communicating with said memory to retrieve a firmware from a plurality of firmware and executing said retrieved firmware to communicate with and control each of said plurality of hashboards.

55. The universal control board of claim 54, wherein each of said plurality of interface connectors comprise any one of a socket connector, or a plug-in connector.

56. The universal control board of claim 54, further including a plurality of electrical switches electrically coupled to said plurality of interface connectors and in electrical communication with said system on module circuit, each of said plurality of electrical switches configured by users to provide a binary value processed by said one or more processors to assign a hashboard identifier to each of said plurality of hashboards, each of said assigned hashboard identifiers defining a same type or model hashboard.

57. The universal control board of claim 56, wherein each of said plurality of electrical switches comprises any of a dip switch, a toggle switch, and a rocker switch.

58. The universal control board of claim 56, wherein said one or more processors includes any of one or more central processing units, one or more main processing units, one or more micro-processors, and one or more field programmable gate array chips, and said memory includes any of one or more DDR memory chips, one or more NAND memory chips, or any combination thereof.

59. The universal control board of claim 58, wherein said plurality of firmware includes a first firmware comprising first firmware instructions for communicating with and controlling each of a first plurality of hashboards based on first hashboard identifiers associated with each of said first plurality of hashboards, and a second firmware comprising second firmware instructions for communicating with and controlling each of a second plurality of hashboards based on second hashboard identifiers associated with each of said second plurality of hashboards, said first hashboard identifiers associated with a first type or model hashboard, and said second hashboard identifiers associated with a second type or model hashboard, said one or more processors retrieving and executing each of said plurality of firmware one at a time where simultaneous retrieval and execution of multiple firmware is restricted.

60. The universal control board of claim 59, wherein each of said plurality of firmware includes a plurality of drivers, each driver comprising computer-executable driver instructions where upon selectively operating said one or more processors, said one or more processors retrieves one of said plurality of drivers based on said one or more processors determining that each of said plurality of hashboards comprises a same hashboard identifier, and executes said one retrieved drivers to communicate with and control each of said plurality of hashboards when electrically connected to each of said plurality of interface connectors.

61. The universal control board of claim 58, wherein each of said hashboard identifiers are associated with a binary value settable by said electrical switches, each binary value defining any of a sum total number of mining chips provided on each of said plurality of hashboards, a model number, a serial number, a brand name, a bin number, or name of a manufacturer that is associated with each of said cryptocurrency miners housing said plurality of hashboards, or associated with each of said plurality of hashboards.

62. The universal control board of claim 61, wherein each of said plurality of interface connectors includes a predetermined number of general purpose input-output pins, said one or more field programmable gate array chips programmed to map said predetermined general purpose input-output pins to transmit communicating signals to each of said plurality of hashboards or to each electrical switch and retrieve said hashboard identifiers or said binary values stored in one or more electrically erasable programmable read-only chips, one or more erasable programmable read-only chips, a peripheral interface controller provided on each of said plurality of hashboards, in said DDR memory, or in said NAND memory.

63. The universal control board of claim 62, wherein said system on module circuit further includes any of one or more universal asynchronous receiver-transmitter chips, or a chip peripheral interface for electrically communicating with said one or more electrically erasable programmable read-only chips, erasable programmable read-only chips, or said peripheral interface controller, via, said general purpose input-output pins to retrieve said hashboard identifiers when each of said plurality of hashboards is electrically connected to each of said plurality of interface connectors.

64. The universal control board of claim 54, further including a plurality of adapters, each adapter including a plurality of electrical adapter connectors comprising a plurality of female ports in electrical continuity with a corresponding plurality of male pins, each of said plurality of adapters electrically connecting each of said plurality of hashboards to said plurality of interface connectors.

65. The universal control board of claim 54, further including a plurality of adapter boards, each adapter board including a plurality of electrical adapter connectors comprising a plurality of female ports in electrical continuity with a corresponding plurality of male pins, one of said plurality of adapter boards including two electrical adapter connectors aligned next to each other along a first horizontal axis, said two electrical adapter connectors adjacent to, and in parallel with, another two electrical adapter connectors aligned next to each other along a second horizontal axis, another of said adapter boards including a second plurality of electrical adapter connectors, each of said second plurality of electrical adapter connectors aligned adjacent to, and in parallel with, each other along a vertical axis, each of said plurality of adapter boards removably attachable to each of said plurality of electrical hashboard connectors to electrically connect each of said plurality of hashboards to each of said plurality of electrical hashboard connectors.

66. The universal control board of claim 54, further including light emitting diodes for indicating operational metrics of said universal control board, said light emitting diodes electrically coupled to, and controlled by, said one or more processors on said system on module circuit said one or more processors powering one of said light emitting diodes based on an operation metric comprising at least one of said plurality of hashboards having a different hashboard identifier than a remainder of said plurality of hashboards.

* * * * *